(12) United States Patent
Ross et al.

(10) Patent No.: US 9,849,785 B1
(45) Date of Patent: Dec. 26, 2017

(54) METHOD AND APPARATUS FOR STATE SPACE TRAJECTORY CONTROL OF UNCERTAIN DYNAMICAL SYSTEMS

(71) Applicant: The United States of America, as represented by the Secretary of the Navy, Washington, DC (US)

(72) Inventors: Isaac Michael Ross, Monterey, CA (US); Mark Karpenko, Marina, CA (US); Ronald Joseph Proulx, Newton, MA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/188,505

(22) Filed: Jun. 21, 2016

Related U.S. Application Data

(63) Continuation-in-part of application No. 14/844,227, filed on Sep. 3, 2015, which is a continuation-in-part
(Continued)

(51) Int. Cl.
G01C 22/00 (2006.01)
G05D 1/00 (2006.01)
B60K 37/06 (2006.01)

(52) U.S. Cl.
CPC .................................. *B60K 37/06* (2013.01)

(58) Field of Classification Search
USPC .......................................................... 701/25
See application file for complete search history.

(56) References Cited

U.S. PATENT DOCUMENTS 4,625,647 A * 12/1986 Laures .................... F42C 13/00
102/211
5,452,518 A * 9/1995 DiPersio .................. G01V 3/26
33/301

(Continued)

OTHER PUBLICATIONS

Julier, Simon J. et al., "The Scaled Unscented Transformation," Proc. Amer. Control Conf., 2002, pp. 4555-4559.

(Continued)

*Primary Examiner* — Jean-Paul Cass
(74) *Attorney, Agent, or Firm* — Naval Postgraduate School; James B. Potts; Lisa A. Norris

(57) ABSTRACT

Methods, systems and computer readable media are presented for computing a guidance control policy to transition an uncertain dynamical system from an initial state to a final state, in which a set of points are computed to provide discreet and accurate representation of uncertainty, and in which a guidance control policy is computed based on a set of equations involving the initial state, the final state, state variables, control variables, and parameters, as well as designated parameters of interest, a set of constraints corresponding to state and control variables, a performance metric, statistical distribution types corresponding to the parameters of interest, statistical moments individually corresponding to the parameters of interest, and weighting values corresponding to the parameters of interest. A guidance control policy which defines control variables for transitioning from the initial state to the final state which is robust to the considered system uncertainty is computed according to the computed set of points and the performance metric.

14 Claims, 30 Drawing Sheets

Related U.S. Application Data of application No. 14/081,921, filed on Nov. 15, 2013, now abandoned.

(60) Provisional application No. 61/735,517, filed on Dec. 10, 2012.

(56) References Cited

U.S. PATENT DOCUMENTS

| | | | |
|---|---|---|---|
| 5,627,768 A | 5/1997 | Uhlmann et al. | |
| 5,963,888 A | 10/1999 | Uhlmann et al. | |
| 6,047,927 A * | 4/2000 | Heiberg | B64G 1/286 244/165 |
| 6,169,981 B1 * | 1/2001 | Werbos | G05B 13/0265 706/15 |
| 6,305,647 B1 * | 10/2001 | Defendini | B64G 1/28 244/165 |
| 6,829,568 B2 | 12/2004 | Julier et al. | |
| 7,289,906 B2 | 10/2007 | van der Merwe et al. | |
| 7,558,673 B1 * | 7/2009 | Qu | G01W 1/02 374/109 |
| 7,831,416 B2 * | 11/2010 | Grichnik | G06F 17/5009 703/1 |
| 8,311,973 B1 * | 11/2012 | Zadeh | G06N 7/02 706/62 |
| 8,780,342 B2 * | 7/2014 | DiBernardo | G01S 5/163 356/139 |
| 9,360,300 B2 * | 6/2016 | DiBernado | |
| 2003/0204382 A1 | 10/2003 | Julier et al. | |
| 2006/0139355 A1 * | 6/2006 | Tak | G06T 13/40 345/473 |
| 2008/0251646 A1 * | 10/2008 | Heiberg | B64G 1/286 244/165 |
| 2010/0002929 A1 * | 1/2010 | Sammak | G06K 9/00127 382/133 |
| 2010/0057222 A1 * | 3/2010 | Turner | G05B 17/02 700/31 |
| 2010/0228409 A1 | 9/2010 | Acikmese et al. | |
| 2011/0231320 A1 * | 9/2011 | Irving | G06Q 30/00 705/80 |
| 2013/0273968 A1 * | 10/2013 | Rhoads | G06F 17/30244 455/556.1 |
| 2014/0201126 A1 * | 7/2014 | Zadeh | G06K 9/627 706/52 |

OTHER PUBLICATIONS

Julier, Simon J. et al., "Unscented Filtering and Nonlinear Estimation," Proceedings of the IEEE, vol. 92, No. 3, Mar. 2004, pp. 401-422.

Saunders, Benjamin R., "Optimal Trajectory Design Under Uncertainty," Massachusetts Institute of Technology, Cambridge, MA, Submitted to the Dept. of Aeronautics and Astronautics, May 24, 2012, pp. 1-123.

Shen, Haijun et al., "Desensitizing the Minimum-Fuel Powered Descent for Mars Pinpoint Landing," Journal of Guidance, Control, and Dynamics, vol. 33, No. 1, Feb. 2010, pp. 108-115.

Seywald, Hans, "Desensitized Optimal Trajectories with Control Constraints," Analytical Mechanics Associates, Inc., Hampton, VA, AMA Report No. 03-28, Aug. 2003, pp. 1-8.

Park, Ryan S. et al., "Nonlinear Mapping of Gaussian Statistics: Theory and Applications to Spacecraft Trajectory Design," Journal of Guidance, Control, and Dynamics, vol. 29, No. 6, Nov.-Dec. 2006, pp. 1367-1375.

Adurthi, Nagavenkat et al., "The Conjugate Unscented Transform— An Approach to Evaluate Multi-Dimensional Expectation Integrals," 2012 American Control Conference, Fairmont Queen Elizabeth, Montreal, CA, Jun. 27-Jun. 29, 2012, pp. 5556-5561.

Li, Jr-Shin et al., "Optimal Pulse Design in Quantum Control: A Unified Computational Method," Proc. of the National Academy of Sciences of the USA, Early Edition, 2010, pp. 1-6.

Zimmer, Scott J., "Reducing Spacecraft State Uncertainty Through Indirect Trajectory Optimization," The University of Texas at Austin, 2005, pp. 1-187.

Small, Todd V., "Optimal Trajectory-Shaping with Sensitivity and Covariance Techniques," Department of Aeronautics and Astronautics, Massachusetts Institute of Technology, US, 2010, pp. 1-130.

Ross, I. Michael, "A Beginner's Guide to DIDO: A MATLAB Application Package for Solving Optimal Control Problems," Elissar Global, Carmel, CA, Version 7.3, Nov. 2007, p. 1-44.

Julier, Simon et al., " A Consistent, Debiased Method for Converting Between Polar and Cartesian Coordinate Systems," The Robotics Research Group, Department of Engineering Science, The University of Oxford, U.K., Proc. AeroSense: Acquisition, Tracking and Pointing, 3086, 1997, pp. 110-121.

Bairstow, S.H., "Optimal pulse design in quantum control: A unified computational method," Boston, MA, Massachusetts Institute of Technology, 2004.

\* cited by examiner

METHOD AND APPARATUS FOR STATE SPACE TRAJECTORY CONTROL OF UNCERTAIN DYNAMICAL SYSTEMS

REFERENCE TO RELATED APPLICATIONS

This application is a continuation-in-part application of U.S. patent application Ser. No. 14/844,227, filed Sep. 3, 2015, entitled "Method and Apparatus for Guidance and Control of Uncertain Dynamical Systems", which is a continuation-in-part application of U.S. patent application Ser. No. 14/081,921, filed Nov. 15, 2013, entitled "Method and Apparatus for Guidance and Control of Uncertain Dynamical Systems." This application claims priority to and the benefit of U.S. patent application Ser. No. 14/844,227, filed Sep. 3, 2015, entitled "Method and Apparatus for Guidance and Control of Uncertain Dynamical Systems"; which further claims priority to and the benefit of U.S. patent application Ser. No. 14/081,921, filed Nov. 15, 2013, entitled "Method and Apparatus for Guidance and Control of Uncertain Dynamical Systems", which further claims priority to and the benefit of U.S. Provisional Patent Application Ser. No. 61/735,517, filed Dec. 10, 2012, entitled "Method and Apparatus for Guidance and Control of Uncertain Dynamical Systems", the entireties of both applications are hereby incorporated by reference.

BACKGROUND

Design and implementation of non-linear guidance and control policies for dynamical systems that are robust to uncertainties in the initial and final state conditions, environmental parameters (e.g. pressure, temperature, obstacles, keep out zones, etc.), system parameters, path or route constraints and/or exogenous disturbances has previously been difficult due to ever present limitations on computational resources. Conventionally, a guidance and control policy is determined by optimizing a performance index, such as minimum effort, or minimum transition time assuming nominal initial conditions, system parameters and environmental conditions. A control policy designed in this manner is then typically subjected to a post-design Monte-Carlo analysis by selecting different possible operating conditions (e.g. initial conditions, parameter variations, etc.) to verify its effectiveness over the anticipated range of system uncertainties. A post-design Monte-Carlo analysis tests the ability of a nominal control policy to transition a perturbed dynamical system to the desired final state. A post-design Monte-Carlo analysis, however, is costly in terms of computation time. Moreover, the successful outcome of a Monte Carlo analysis depends on the properties of an initial nominal control policy and associated nominal system trajectory that is created previously, without regard to robustness. This cut and dry approach (i.e. design followed by post-design analysis and iteration) can lead to poor overall performance in the presence of uncertainties, and/or the need for multiple iterations before converging on a guidance and control policy having the desired behavior in the presence of uncertainties. Additionally, a guidance and control policy developed in this way may be overly conservative and prevent an otherwise high-performance dynamic system from being utilized to its full potential. Thus, to meet a given performance objective, the dynamical system may need to be overdesigned, which increases cost. Accordingly, improved techniques and apparatus are desirable for determining and implementing a guidance and control policy to transition a given dynamical system from an initial state to a desired final state in the presence of constraints and uncertainties regarding the initial and final states, the system parameters, environmental parameters and/or other disturbances.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of this disclosure and the exemplary embodiments provided herein, in a simplified form prior to a more detailed description that is presented hereinafter. The present disclosure relates to guidance and control policy determination for transitioning a controlled system from an initial state to a desired final state in the presence of uncertainties and disturbances in the controlled system as well as in the environment, and includes a mechanism for including the influence of operational constraints on the system parameters and state/control trajectories (path) as part of the guidance and control policy determination.

In accordance with one or more aspects of the present disclosure, methods and systems are provided for guidance and control policy computation by which a controlled system can be transitioned from an initial state through a state space to a final state. The method includes characterizing a problem space through a defined set of equations such as differential equations involving initial and final states, state variables, control variables, and parameters, as well as defining a set of constraints individually corresponding to at least some of the state, parameter and/or control variables and defining a performance metric that enables the performance of the controlled system to be characterized (e.g. time, energy, range, etc.). The method further involves use of one or more processors to compute a set of points providing a discreet representation of system, parametric and/or environmental uncertainty at any instant in time as the controlled system is transitioned through the state space from the initial state to the final state. Any collection of points may be employed, and are chosen based on problem requirements. For example, the points could correspond to upper and lower bounds of a selected parameters space. They may also be computed based at least partially on a set of parameters of interest selected from the parameters of the problem space, and a selected set of statistical distribution types (e.g., uniform, Gaussian, Poisson, Beta, frequency, binomial, etc.), and on statistical moments and weighting values individually corresponding to the parameters of interest. (Individual parameters may have different statistical characterizations, e.g. one parameter Gaussian, and another Uniform.) The processor is further used to compute the guidance and control policy according to the time variation in the controlled set of computed points and the performance metric, for example, to minimize the error in reaching a desired final state that is caused by the uncertainty in the parameters of interest. In one example, the control policy may be computed based upon a statistical measure of the uncertainty in the final state such as minimizing the trace of a function defining the covariance at the final state, or minimizing an integral of the trace of the state error covariance. In certain implementations, moreover, the set of points is a non-arbitrary set of points that are computed by using the processor to solve a constrained non-linear programming problem resulting from the application of the method of the present disclosure. In certain embodiments, the set of points is computed at least partially according to one or more bounds or keep-out zones and/or one or more slack variables corresponding to the statistical moments.

Further aspects of the disclosure relate to a non-transitory computer readable medium with computer executable instructions for computing a guidance control policy, and a system to transition a controlled system through a state space from an initial state to a final state. The system includes an electronic memory and one or more processors operatively coupled with the memory. The processor(s) is/are programmed or configured to compute a set of points enabling computation of a discreet representation of a performance metric related to transitioning the controlled system through the state space from the initial state to the final state, to compute a guidance control policy according to a computed set of points and a performance metric, and to provide a guidance control policy to a command a dynamical system.

According to an exemplary embodiment of this disclosure, provided is a computer-implemented method for generating and executing a guidance control policy operatively associated with transitioning a dynamically controlled system operatively associated with controlling an object and respective trajectory through a state space from an initial state to a final state, the method comprising: generating a set of equations which characterize the state space (and the state space dynamics), the set of equations characterizing the initial state, the final state, one or more state variables, one or more control variables, and a plurality of parameters associated with the dynamically controlled system; generating a set of constraints, each constraint corresponding to one or more single states and single control variables; generating a performance metric, the performance metric measuring performance including the operatively associated object of the guidance control policy to transition the dynamically controlled system through the state space from the initial state to the final state; generating a set of multidimensional HS (Hyper-Pseudospectral) points providing a discrete representation of uncertainty associated with a variation of the plurality of parameters in transitioning the dynamically controlled system through the state space from the initial state to the final state, the dimensionality of the HS points corresponding to a set of parameters of interest selected from the plurality of parameters and the set of multidimensional HS points being computed at least partially according to: selecting the set of parameters of interest from the plurality of parameters of the state space dynamics, selecting a set of statistical distribution types, each statistical distribution type corresponding to a variation of a respective individual parameter of interest, selecting a set of statistical moments, each statistical moment corresponding to a respective statistical distribution type of the individual parameter of interest, selecting a set of moment constraint equations, each corresponding to a statistical moment of interest, and selecting a set of weighting values, each weighting value corresponding to a respective individual parameter of interest, and computing the set of multidimensional HS points as a function of the set of parameters of interest, the set of statistical distribution types, the set of statistical moments, and the set of weighting values; computing the guidance control policy defining the control variables and their time histories and generating a control vector for transitioning the dynamically controlled system through the state space from the initial state to the final state according to the computed set of multidimensional HS points and the performance metric; and controlling the dynamically controlled system in accordance with the guidance control policy and generated control vector to transition the dynamically controlled system and operatively associated object trajectory and respective trajectory through the state space from the initial state to the final state.

According to another exemplary embodiment of this disclosure, provided is a non-transitory computer readable medium with computer executable instructions for generating and executing a guidance control policy operatively associated with transitioning a dynamically controlled system operatively associated with controlling an object and respective trajectory through a state space from an initial state to a final state, comprising computer executable instructions to execute the method comprising: generating a set of equations which characterize the state space and state space dynamics, the set of equations characterizing the initial state, the final state, one or more state variables, one or more control variables, and a plurality of parameters associated with the dynamically controlled system; generating a set of constraints, each constraint corresponding to one or more single states and single control variables; generating a performance metric, the performance metric measuring performance including the operatively associated object of the guidance control policy to transition the dynamically controlled system through the state space from the initial state to the final state; generating a set of multidimensional HS (Hyper-Pseudospectral) points providing a discrete representation of uncertainty associated with a variation of the plurality of parameters in transitioning the dynamically controlled system through the state space from the initial state to the final state, the dimensionality of the HS points corresponding to a set of parameters of interest selected from the plurality of parameters and the set of multidimensional HS points being computed at least partially according to: selecting the set of parameters of interest from the plurality of parameters of the state space, selecting a set of statistical distribution types, each statistical distribution type corresponding to a variation of a respective individual parameter of interest, selecting a set of statistical moments, each statistical moment corresponding to a respective statistical distribution type of the individual parameter of interest, selecting a set of moment constraint equations, each corresponding to a statistical moment of interest, and computing the set of multidimensional HS points as a function of the set of parameters of interest, the set of statistical distribution types, the set of statistical moments, and the set of weighting values; computing the guidance control policy defining the control variables and their time histories and generating a control vector for transitioning the dynamically controlled system through the state space from the initial state to the final state according to the computed set of multidimensional HS points and the performance metric; and controlling the dynamically controlled system in accordance with the guidance control policy and generated control vector to transition the dynamically controlled system and operatively associated object and respective trajectory through the state space from the initial state to the final state.

According to another exemplary embodiment of this disclosure, provided is a system for generating and executing a guidance control policy operatively associated with transitioning a dynamically controlled system operatively associated with controlling an object and respective trajectory through a state space from an initial state to a final state, comprising: at least one electronic memory; and at least one processor operatively coupled with the at least one electronic memory and programmed to: generate a set of equations which characterize the state space (and state space dynamics), the set of equations characterizing the initial state, the final state, one or more state variables, one or more control variables, and a plurality of parameters associated with the dynamically controlled system; generate a set of constraints, each constraint corresponding to one or more single states and single control variables; generate a performance metric, the performance metric measuring performance including the operatively associated object of the guidance control policy to transition the dynamically controlled system through the state space from the initial state to the final state; generate a set of multidimensional HS (Hyper-Pseudospectral) points providing a discrete representation of uncertainty associated with a variation of the plurality of parameters in transitioning the dynamically controlled system through the state space from the initial state to the final state, the dimensionality of the HS points corresponding to a set of parameters of interest selected from the plurality of parameters and the set of multidimensional HS points being computed at least partially according to: selecting the set of parameters of interest from the plurality of parameters of the state space, selecting a set of statistical distribution types, each statistical distribution type corresponding to a variation of a respective individual parameter of interest, selecting a set of statistical moments, each statistical moment corresponding to a respective statistical distribution type of the individual parameter of interest, selecting a set of moment constraint equations, each corresponding to a statistical moment of interest, and computing the set of multidimensional HS points as a function of the set of parameters of interest, the set of statistical distribution types, the set of statistical moments, and the set of weighting values; compute the guidance control policy defining the control variables and their time histories and generating a control vector for transitioning the dynamically controlled system through the state space from the initial state to the final state according to the computed set of multidimensional HS points and the performance metric; and control the dynamically controlled system in accordance with the guidance control policy and generated control vector to transition the dynamically controlled system and operatively associated object and respective trajectory through the state space from the initial state to the final state.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 33A illustrates the path of a CMG boresight trace. FIG. 33B illustrates the time history of the CMG singularity index measured during the experiment.

DETAILED DESCRIPTION OF THE DISCLOSURE

Figure 1:
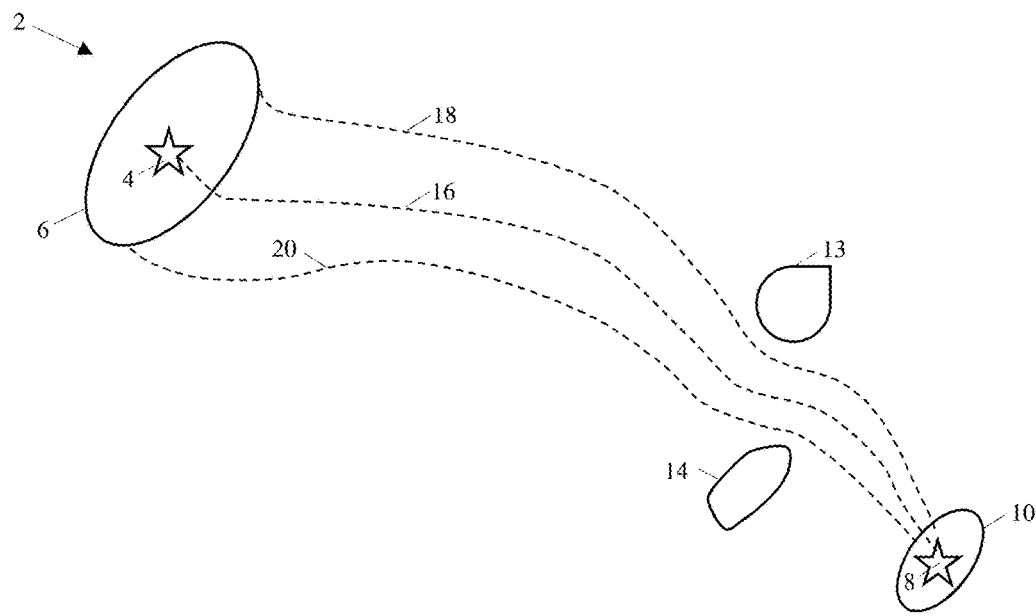
FIG. 1 is a simplified diagram illustrating acceptable state trajectories for an exemplary uncertain dynamical system.

One or more exemplary embodiments or implementations are set forth in conjunction with the drawings, where like reference numerals refer to like elements throughout, and where the various features are not necessarily drawn to scale. It will be understood that many additional changes in the details, materials, procedures and arrangement of parts, which have been herein described and illustrated to explain the nature of the disclosed exemplary embodiments, may be made by those skilled in the art within the principal and scope of the disclosure as expressed in the appended claims. Techniques and apparatus are disclosed for control of uncertain dynamical systems, which may be employed in a variety of applications including without limitation launch vehicle guidance systems, missile guidance systems, spacecraft attitude control systems, weapons systems, robot manipulator control systems, etc. The disclosure in certain implementations provides a specific collection of points intended to sample the domain(s) of uncertainty that need not be in a compact domain, obtained with generalized discretization methods, which in one embodiment leads to the so-called "sigma" points associated with the well-known unscented transformation, with the objective of representing the time-behavior of a collection of perturbed dynamical systems. Here, the notion of a collection (ensemble) of perturbed dynamical systems is utilized to represent the behavior of a nominal controlled system whose performance may be influenced by the presence of uncertainties. The disclosure in certain implementations also provides a specific collection of discrete sampling points referred to herein as hyper-pseudospectral or HS points to parameterize and characterize the uncertainties in the domain(s) of interest. The usage of HS points enables higher-order statistics to be accounted for by the ensemble of dynamical system models and thereby higher-order statistics may be incorporated as part of the control policy computation. The discrete sigma and/or HS points, are used to form a specific collection of copies of dynamical system models that together encode the behavior of the nominal dynamical system over the entire range of system uncertainty considered. The dynamical system models obtained by way of the sigma and/or HS points may then be used to facilitate the computation of a robust guidance control policy for an uncertain system that can be implemented either in open-loop fashion or may be provided as input(s) to an inner, closed-loop, feedback system. Techniques are thus provided for computing a guidance and control policy that defines control variables and their time histories for transitioning the controlled system through the state space from an initial state to a desired final state with robust performance against uncertainties about the nominal system as encoded via a set of points selected via an unscented transform or the HS points whose computation is described herein. Using this approach, the set of all possible initial states and/or parameters within the bounds specified for a particular problem scenario may be sampled in a deterministic fashion by a comparatively small number of sigma and/or HS points and, utilizing the sigma and/or HS points, a control policy is computed in certain embodiments which drives the controlled system to the desired terminal or final state, while maximizing a robustness index or minimizing a performance metric that, via the sampling property of the sigma and/or HS points, considers the influence of the specified uncertainty on the performance of the nominal dynamical system, where minimizing the performance metric reduces, for example, the terminal error at the final state.

In certain embodiments, for example, a control objective can be to minimize the volume of a one-sigma uncertainty ellipsoid at the final state, which can represent a location or orientation in three dimensions. In this regard, the sigma and/or HS points are utilized to facilitate the reconstruction of the statistics (mean, standard deviation, etc.) of the terminal state by propagating the solved control policy though the collection of dynamical models derived from the deterministic sigma point and/or HS point samples. The statistics of the terminal states may also be determined as part of a collocation process if this type of approach is utilized in the computation of the robust guidance policy. Note that arbitrary sample points may also be utilized in certain embodiments of the present disclosure. Proper reconstruction of the statistics on the terminal state may, however, require a large number of arbitrary sample points (generally greater than 1000). Thus, while arbitrary sample points may be used as part of the process for control policy computation described herein, the implementation of the process may be extremely inefficient. A small number of samples, such as upper and lower bounds on parameters can be efficient, but not statistically meaningful; while a large sample, such as can be obtained using a Monte-Carlo selection, is statistically meaningful, but extremely inefficient. The method of the present disclosure may be used to generate a small number of samples that are statistically meaningful, thereby advantageously improving efficiency and accuracy.

While described herein in the context of controlling a system, such as a missile, launch vehicle or spacecraft, for physical transition from an initial position to a desired final or target position in three dimensional space, the disclosed concepts and systems can be utilized in association with transitioning any dynamical system, e.g. biological, chemical, electrical, mechanical, etc., through any desired state space from an initial state to a final state, and can be used in conjunction with any other relevant optimization criteria, such as minimizing energy consumption, minimizing transition time, etc.

Figure 2:
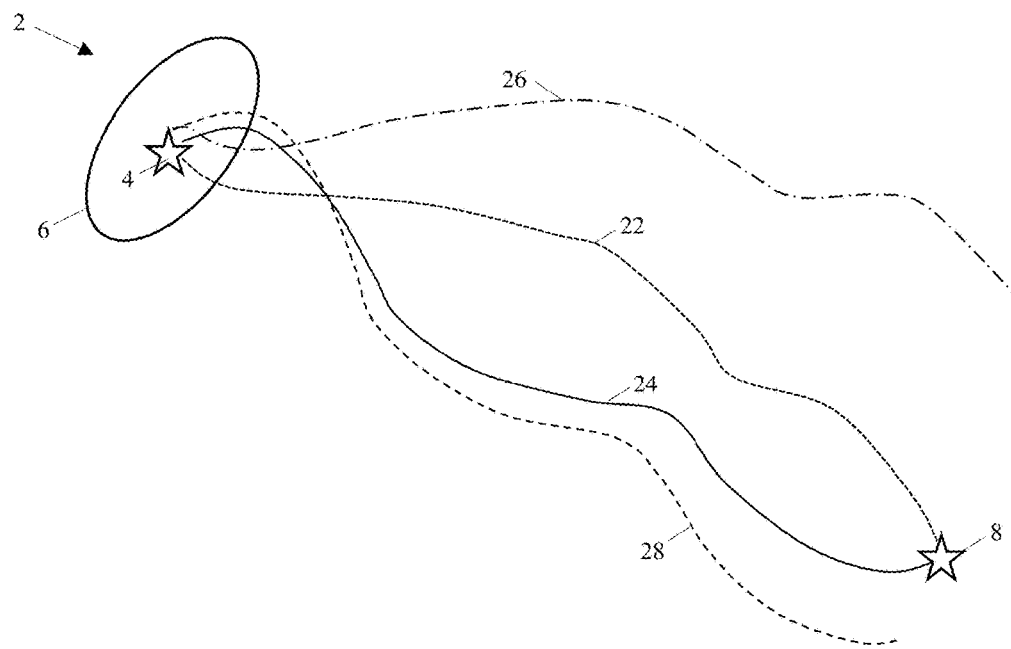
FIG. 2 is a simplified diagram showing two different exemplary nominal feasible trajectories and exemplary errors for each nominal trajectory arising due to various system uncertainties.

FIGS. 1 and 2 provide schematic diagrams 2 illustrating transition of a controlled system, such as a missile in one example, from an initial or starting state 4 in a three dimensional state space to a final or terminal (e.g. target) state 8 in the presence of system and environmental uncertainty. As seen in FIG. 1, an ellipsoid 6 shows an example of uncertainty in the state space regarding the actual initial or starting state 4, and likewise an ellipsoid 10 illustrates exemplary uncertainty in the terminal state 8. In addition, FIG. 1 shows two examples of potential "keep-out" regions 12 and 14 in the state space in which it is desired to avoid having the controlled system transition through the keep-out areas. In the example of missile guidance control, for instance, the keep-out areas 12 and 14 may represent locations of friendly vessels, with the target state 8 representing an enemy craft, and the initial or starting state 4 representing the assumed current position of a firing vessel. Thus, the keep-out areas 12 and 14 serve to represent uncertain trajectory or path constraints in the state space between the initial state 4 and the final state 8. FIG. 1 further illustrates three examples of possible trajectories 16, 18 and 20 beginning at different points within the uncertainty region 6 surrounding the initial state 4, and terminating at different locations within the uncertainty region 10 surrounding the target final state 8.

Nominal trajectory 16 represents the state space trajectory of the nominal dynamical system for the given guidance control policy. Trajectories 18 and 20, on the other hand, represent other possible off nominal trajectories that may be obtained when the same guidance control policy as was used to generate nominal trajectory 16 is applied under uncertain conditions as represented by ellipse 6. FIG. 1 thus illustrates the effects of initial state and/or system and/or environmental uncertainties on the ability of a missile or other dynamical system to reach the desired terminal state 8 using a given control policy. In the presence of uncertainty, a trajectory originating from anywhere in ellipse 6 (including the nominal initial state 4) will reach a terminal state that is contained within terminal ellipse 10, which includes that desired end target state 8. In many applications it is desired to reduce the size of ellipse 10 (computed based on statistical metrics or other means) as much as possible within the operational constraints of the dynamical system.

FIG. 2 further illustrates the influence of system uncertainty on the performance of a dynamical system as the exemplary errors associated with two nominal feasible trajectories, wherein a first trajectory 22 using a given control policy may transition the system from the initial state 4 to the target state 8, whereas an associated perturbed trajectory 26 does not reach the target state 8 due to the effects of the system uncertainty. Likewise, another possible nominal feasible trajectory 24 (using a different control policy than the one used to produce trajectory 22) is illustrated, along with an associated perturbed trajectory 28 (considering the same uncertainty as in perturbed trajectory 26) which again misses the mark. Thus, while there may be many different feasible control policies that can guide a dynamical system to a desired target, the error between the desired end state and the actual terminal condition (the terminal error) can differ when any of these control policies are applied under off nominal (uncertain) conditions. It is highly desirable, therefore to develop a process by which the best feasible control policy can be identified where the usage of the term best refers to the control policy which minimizes the deleterious effects of uncertain conditions as much as possible with respect to given metrics (e.g. mean and/or standard deviation of the terminal error).

Figure 3:
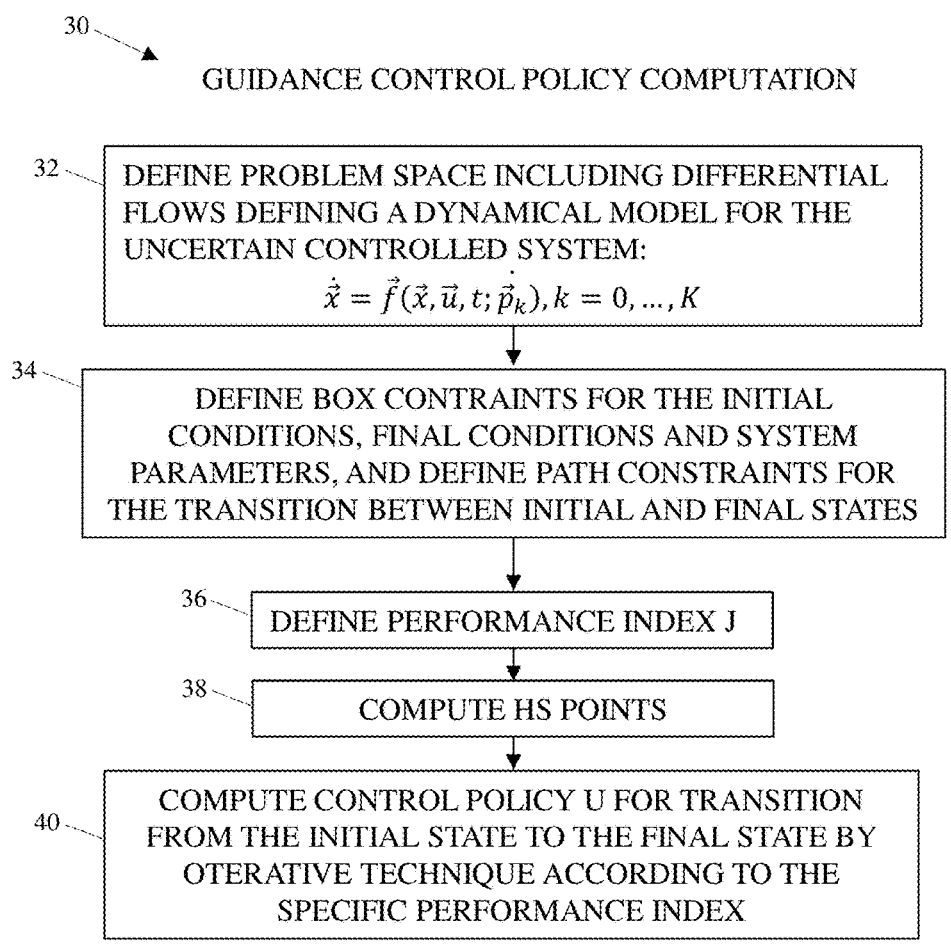
FIG. 3 is a flow diagram illustrating an exemplary process or method for computing a guidance control policy for state space trajectory control of an uncertain dynamical system.
Figure 15:
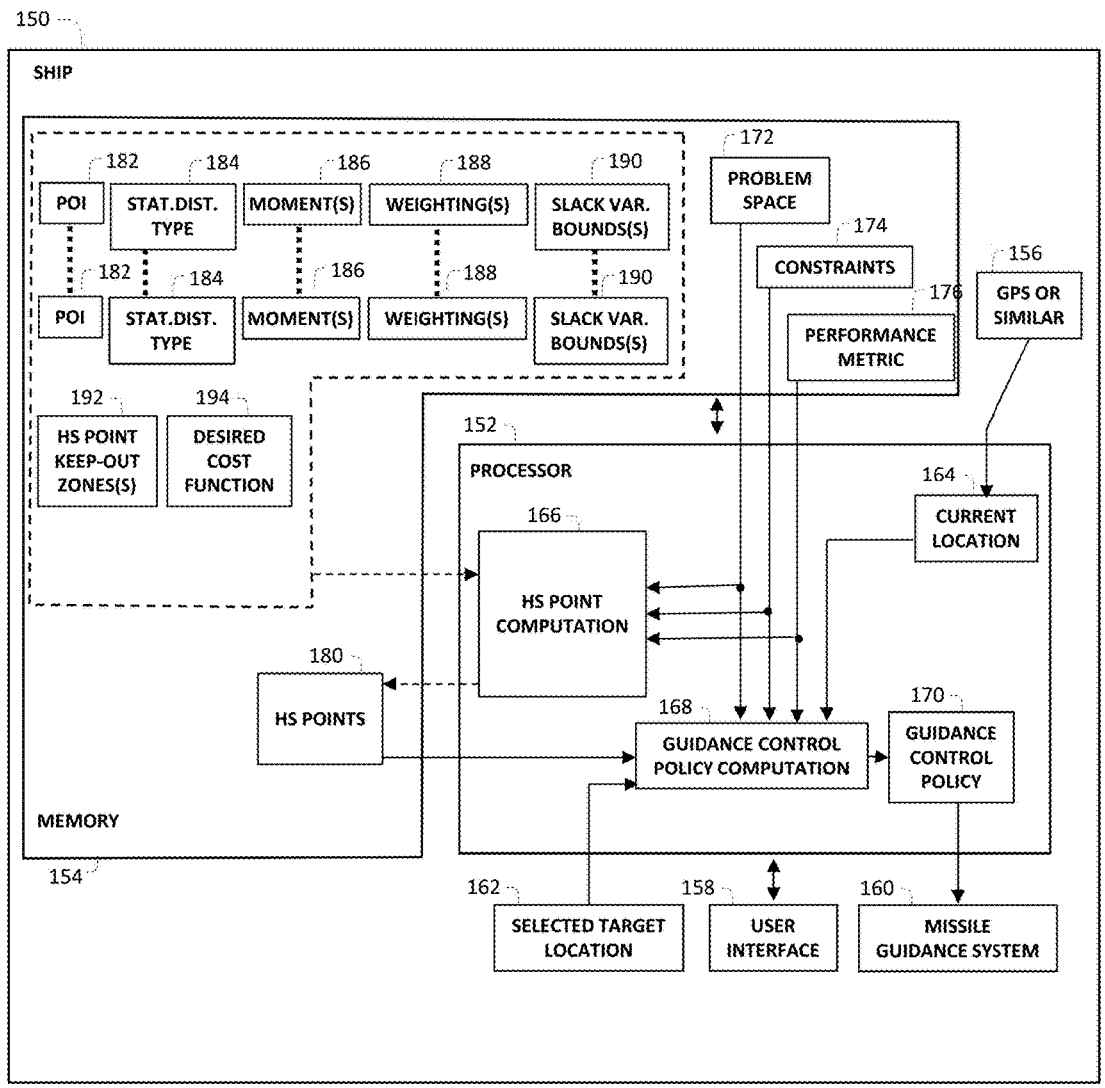
FIG. 15 is a system diagram illustrating an exemplary shipboard-based system for computing a missile guidance control policy and associated HS points.
Figure 16:
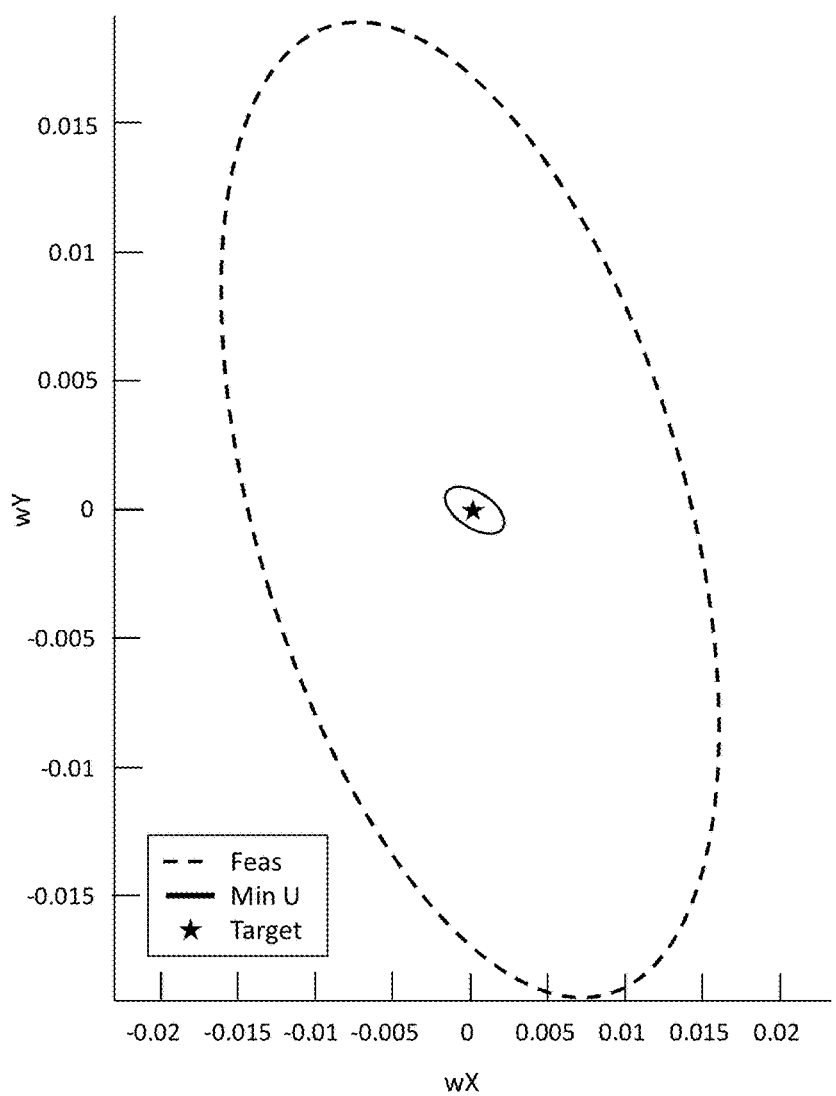
FIGS. 16-24 illustrate exemplary pairwise covariance between rotation rates, and between quaternion components with one feasible minimum time guidance policy versus a guidance policy employing the methods and techniques of the present disclosure to minimize the terminal uncertainty.
Figure 17:
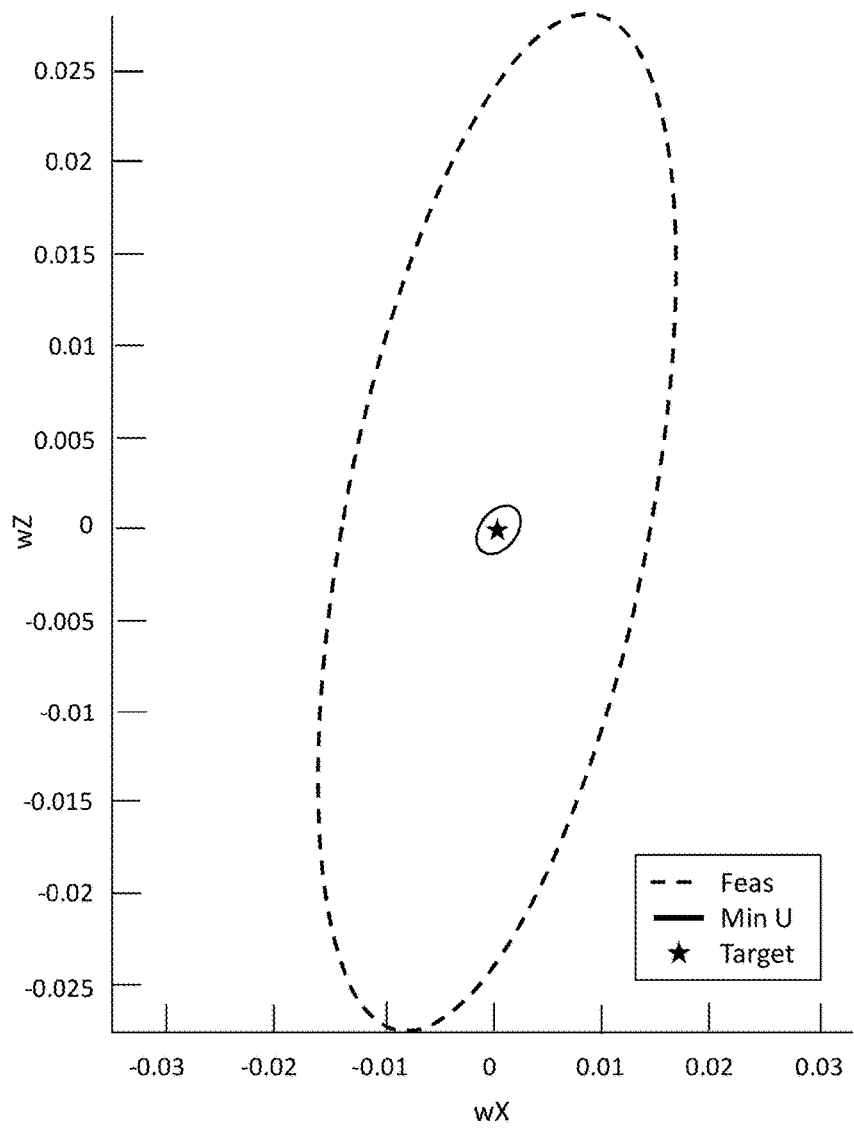
Figure 18:
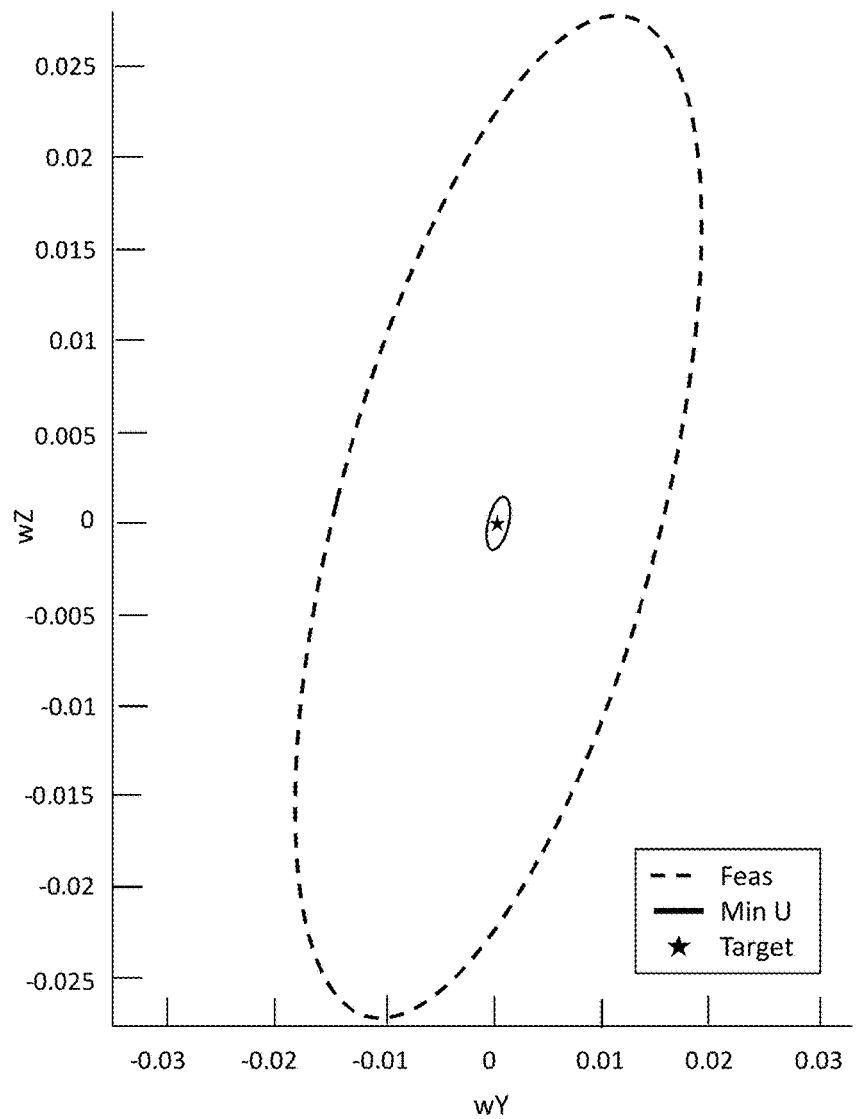
Figure 19:
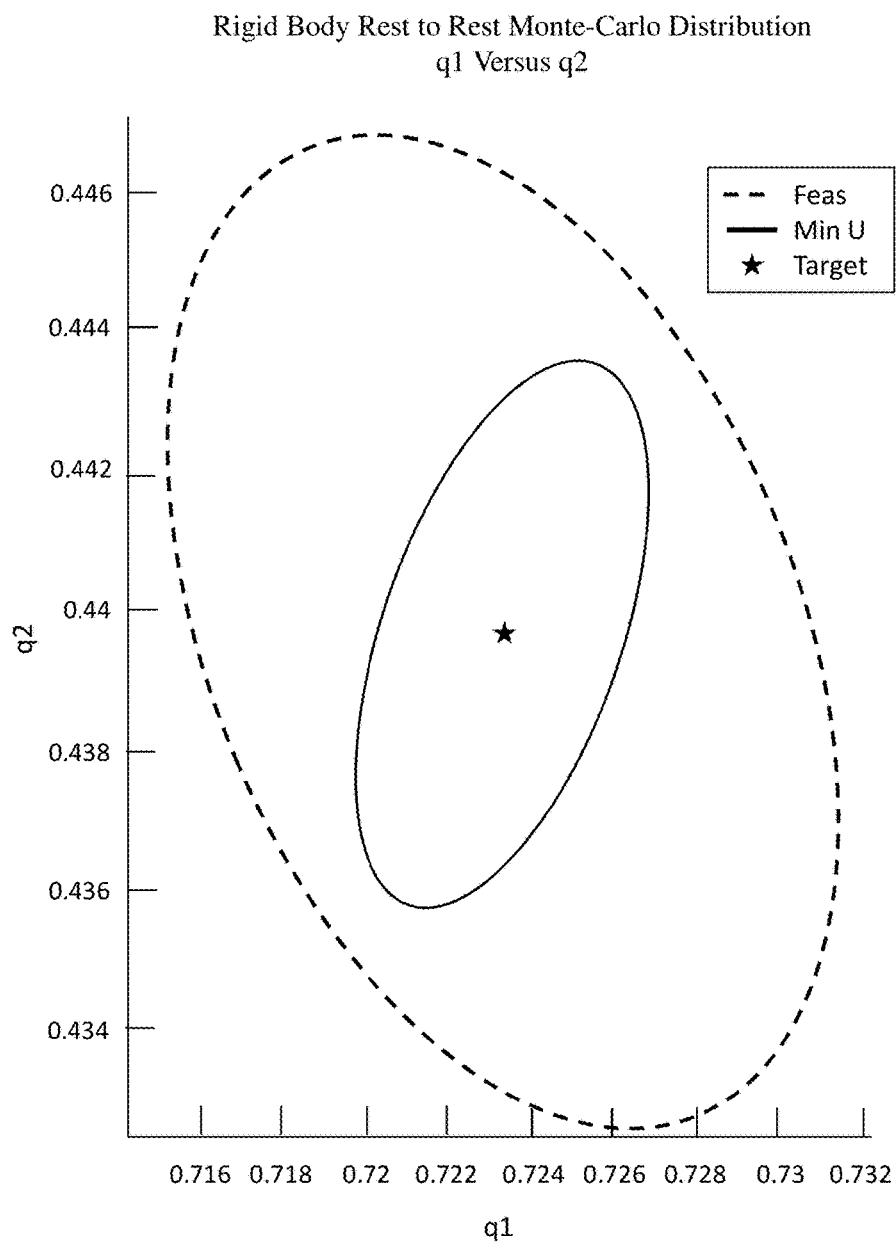
Figure 20:
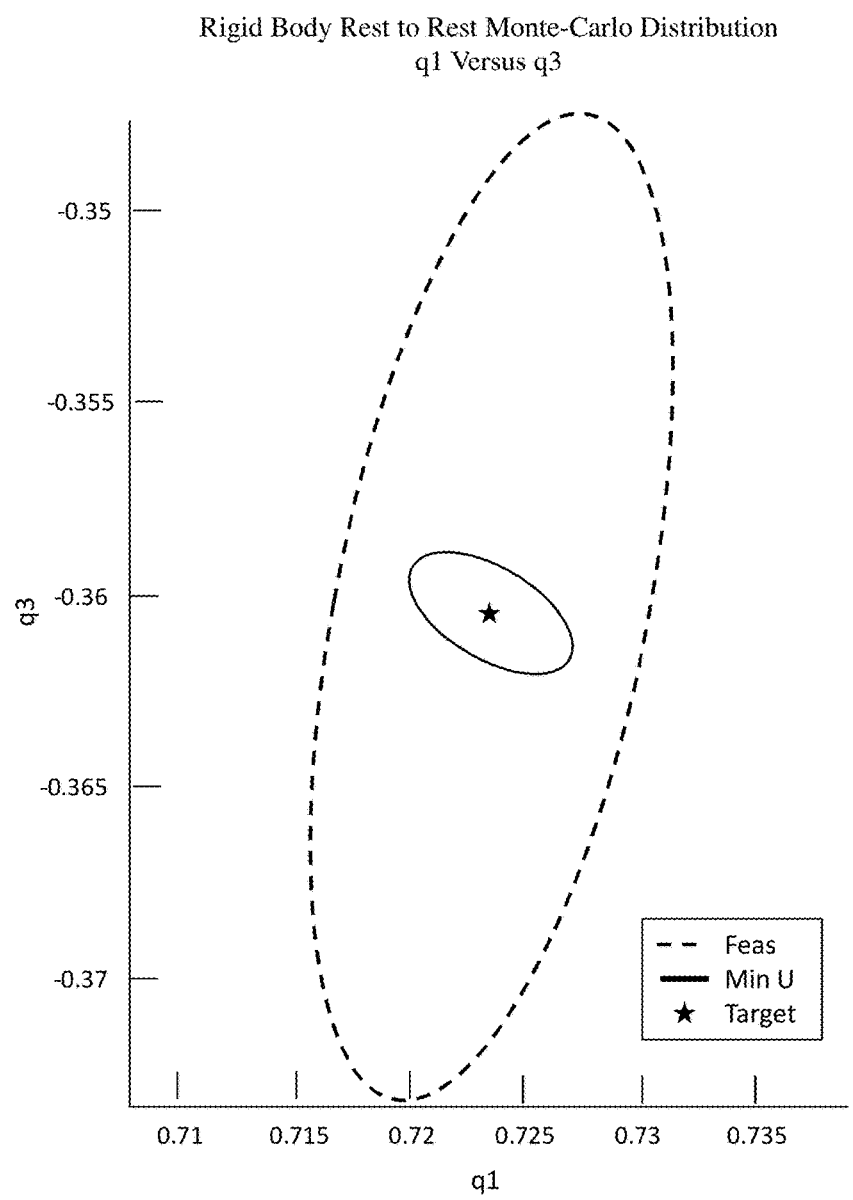
Figure 21:
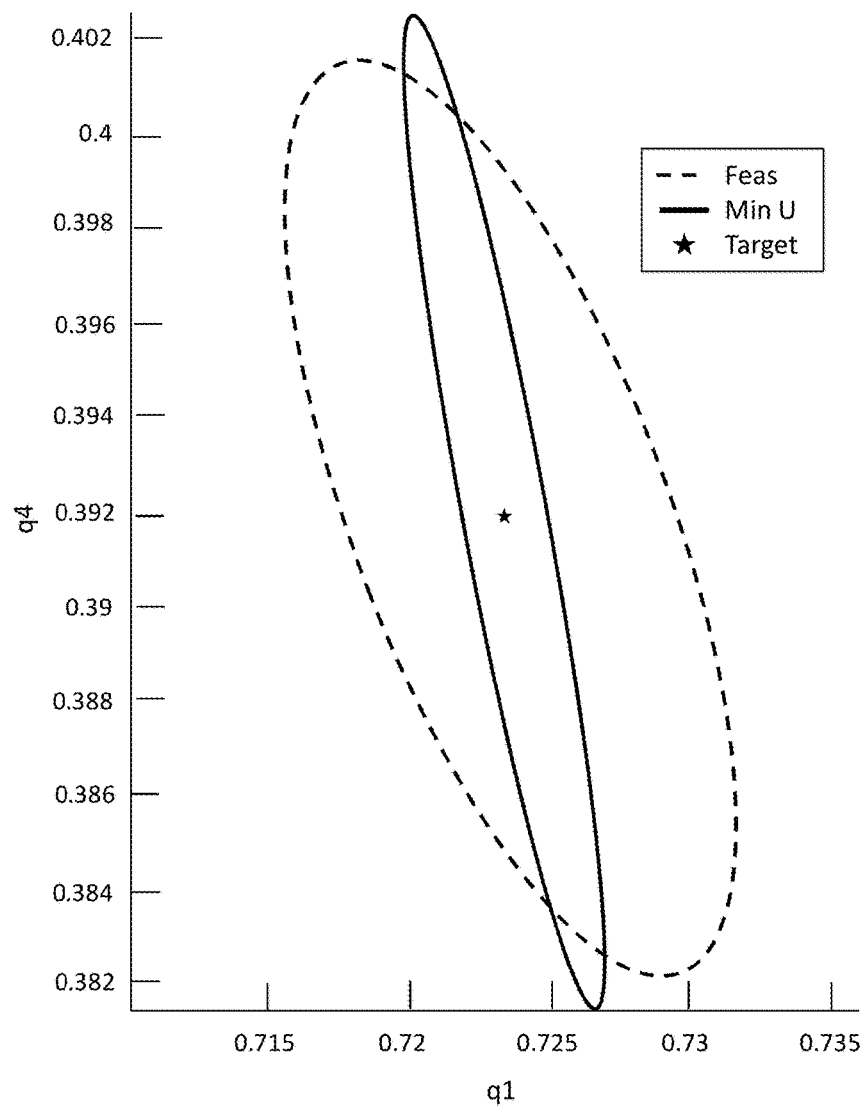
Figure 22:
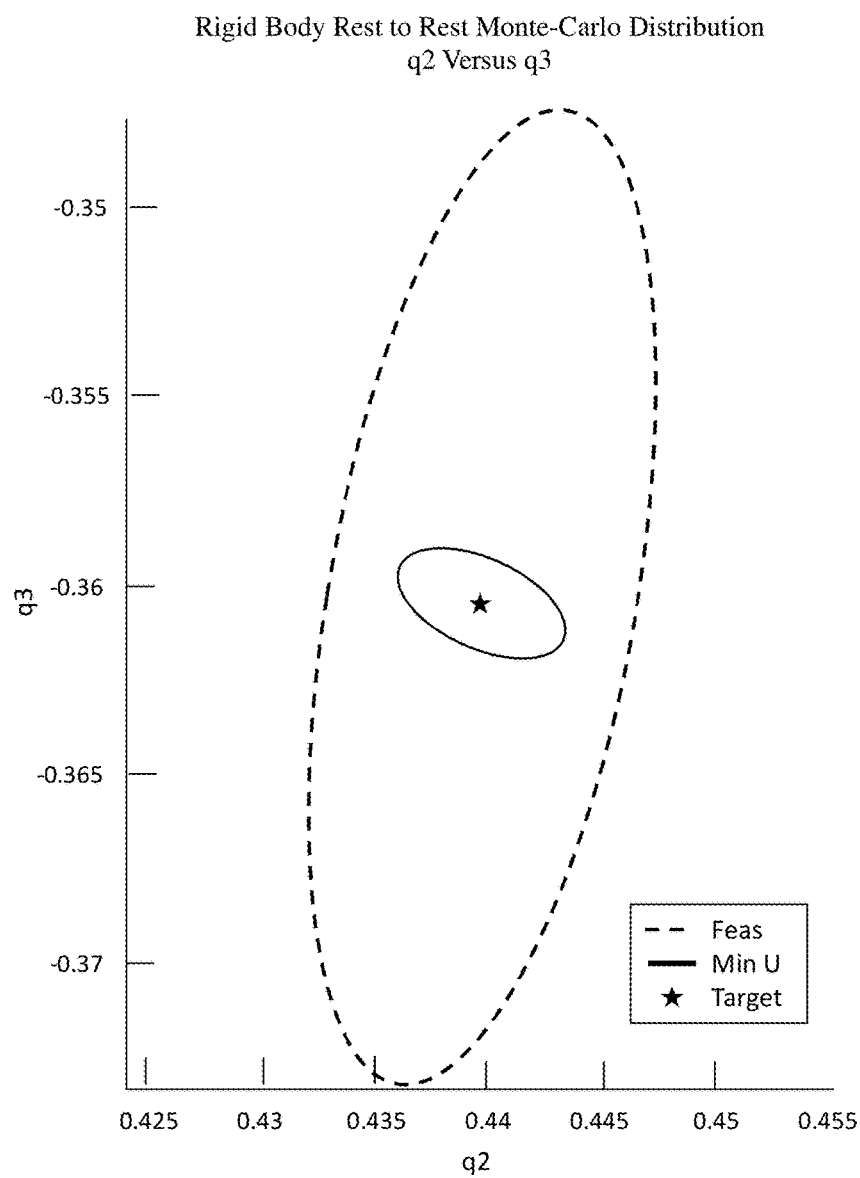
Figure 23:
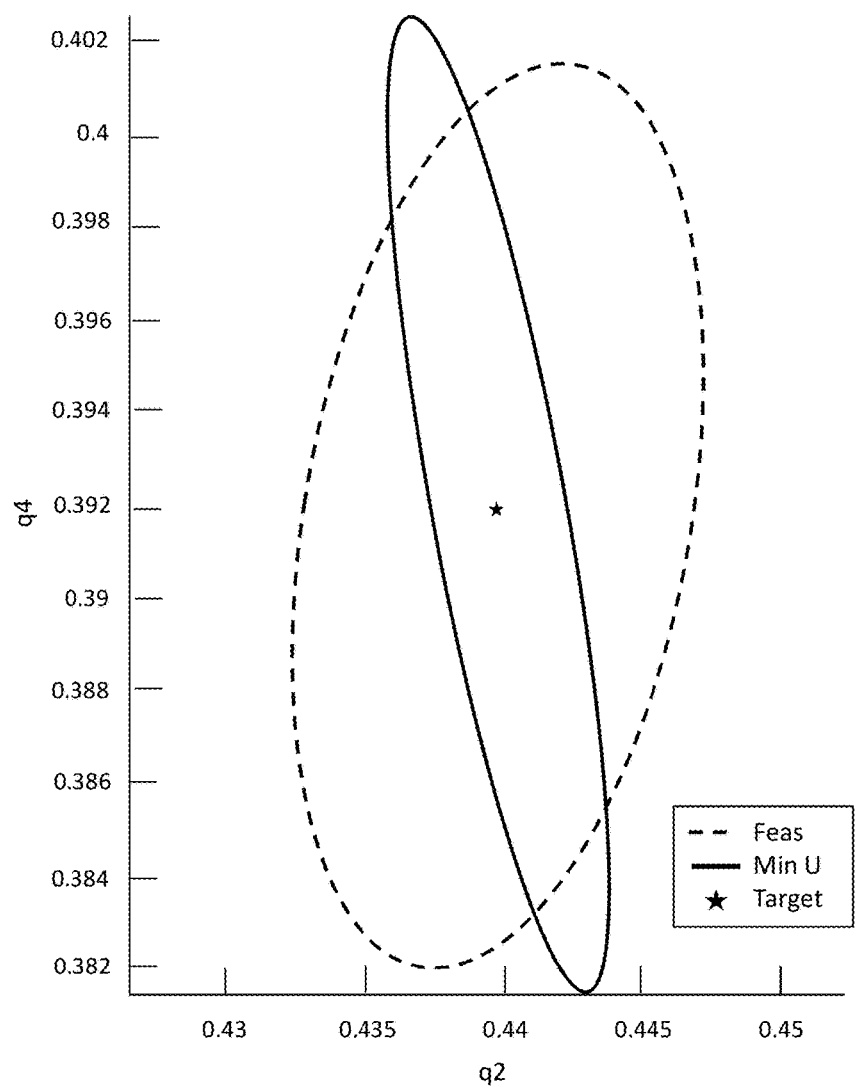
Figure 24:
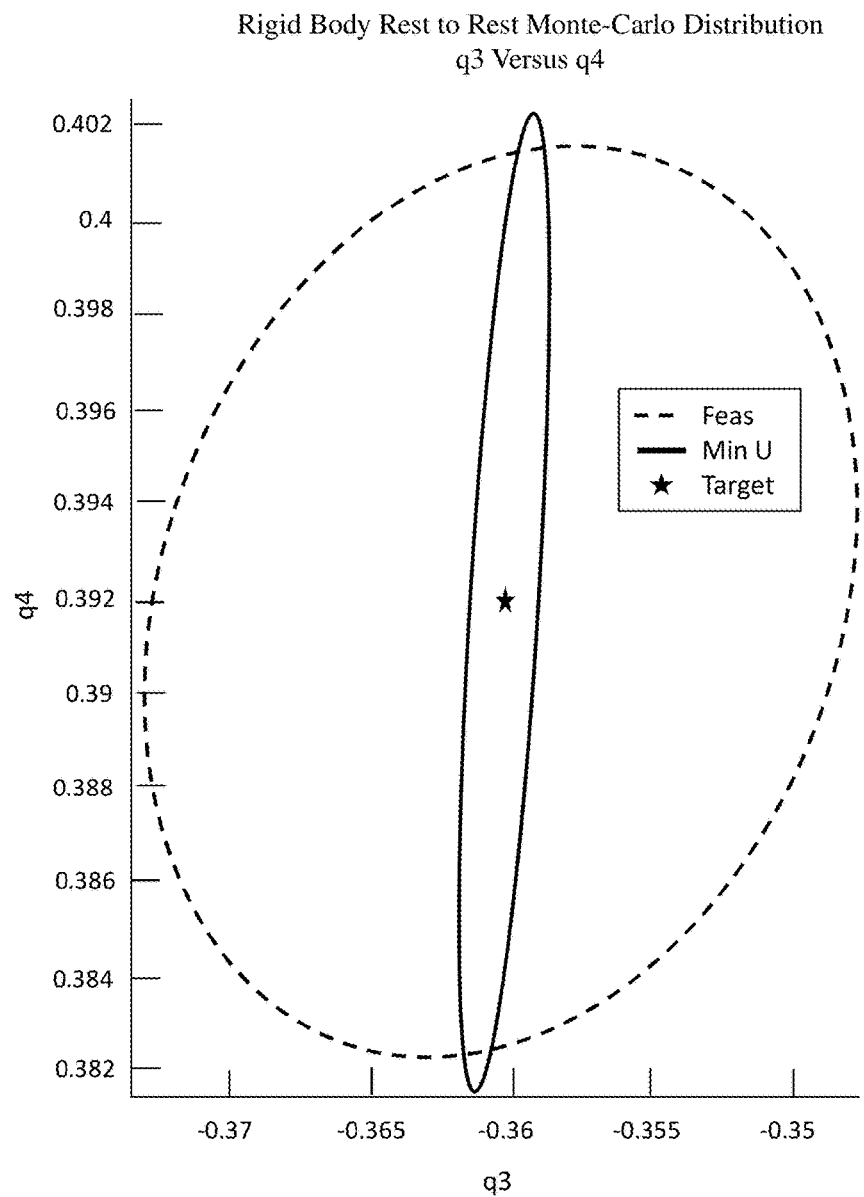

Referring also to FIGS. 3, and 15, the present disclosure advantageously provides for computation of a control policy that reduces target-miss errors arising from off-nominal conditions. Among all feasible guidance and control trajectories, the present techniques advantageously facilitate computationally efficient determination of a feasible guidance control trajectory which is robust with respect to uncertainties, relative to an ensemble-wide performance metric appropriate to the mission. Certain embodiments, moreover, mitigate or avoid linearization of the plant model to leverage the presence of advantageous non-linear coupling, although the process can also be applied to linear plants and non-linear plants that have been linearized. The present disclosure further facilitates the compact characterization of system and environmental uncertainties through use of hyper-pseudospectral (HS) sample points that are generated by a numerical method which allows the generation of a collection of HS points subject to the mission requirements as specified by the user. Certain embodiments of this approach take into account statistical "moment matching", but advantageously enable the moment matching to be carried out only for those moments of interest to the user of the process, and only at the desired degree of relative accuracy. This distinguishes the properties of the HS points described herein from so-called sigma points. The HS point generation concept, moreover, may advantageously relax the standard moment constraints, making them part of a cost index to be minimized. In this regard, the cost index can also include other components completely unrelated to statistical analyses, but relevant in the context of guidance and control. Using the presently disclosed techniques, the computation of the HS points can be completed in a way that weights and/or de-weights the contribution of higher-order statistical moments, and constraints may be added in which the HS points are selected in such a way that certain classes, regions, or numerical values will be restricted by definition of one or more bounds or keep-out zones. For example, it may be known that a certain parameter may take on positive or negative values but never be precisely zero. In this case, selecting a HS point at zero would not be consistent with the system under consideration. The presently disclosed techniques enable a constraint to be added as part of the HS point computation process that prevents a HS point from being selected at zero. The HS points, moreover, can be computed for both bounded and unbounded statistical distribution domains, including but not limited to Gaussian, uniform, Gamma, Beta or other statistical distributions or any combination thereof. For example, if a parameter that describes the plant model has a hard stop, the disclosed approach can incorporate this as a constraint, achieving the best possible selection of points within the scope of such a constraint.

Figure 4:
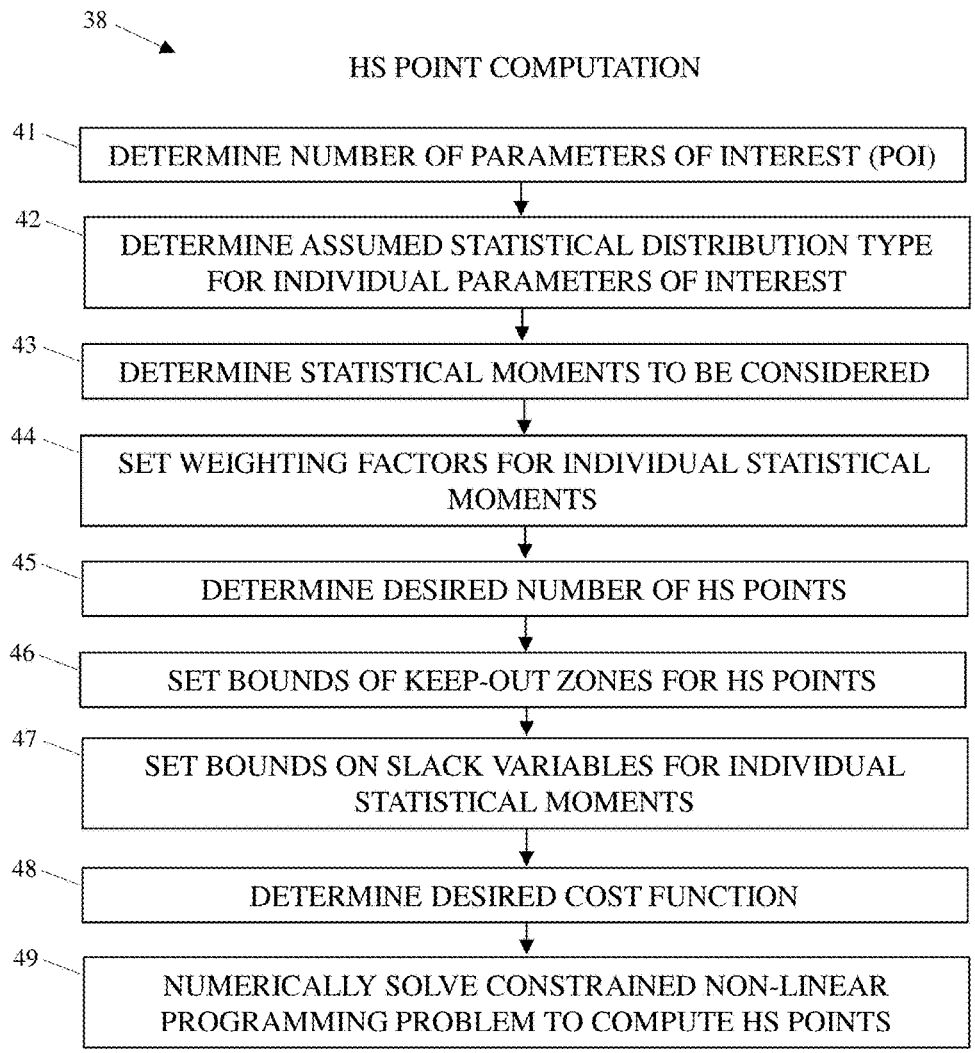
FIG. 4 is a flow diagram illustrating an exemplary process or method for computing hyper-pseudospectral (HS) points for use in the guidance control policy computation process of FIG. 3.

FIG. 3 illustrates an exemplary method or process 30 for computing a guidance control policy including computation of HS points at 38, and FIG. 4 illustrates an exemplary process 38 for HS point computation in accordance with one or more aspects of the present disclosure. Although the illustrated processes or methods 30, 38 and other methods of the present disclosure are depicted and described in the form of a series of acts or events, it will be appreciated that the various methods of the disclosure are not limited by the illustrated ordering of such acts or events except as specifically set forth herein. Except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide various functions as described herein, and possible embodiments or implementations include non-transitory computer readable mediums having computer-executable instructions for performing the illustrated and described methods. For instance, the processes 30, 38 may be implemented in whole, or in part, in the shipboard processor system illustrated and described below in connection with FIG. 15, and the processor 152 in FIG. 15 may be programmed with corresponding computer-executable instructions for implementing the described methods.

FIG. 15 illustrates an exemplary shipboard system 150 having a processor 152 operatively connected with an electronic memory 154, a GPS or similar system 156, a user interface 158, and a weapon guidance system 160 forming a system to perform guidance of a missile or other projectile from a current location 164 (e.g., as determined by the GPS or similar system 156) to a selected target location 162. Thus, the system in FIG. 15 provides guidance control by computation of a guidance control policy 170 using the processor 152 to transition the controlled system (missile) through a state space from an initial state to a final state as described by the selected target location 162. In the illustrated example, the processor 152 operates according to computer executable instructions to implement the functionality set forth herein, which instructions may be stored in the electronic memory 154 or other non-transitory memory or other computer readable medium(s) operatively associated with the processor 152, and uses the memory 154 for storing various parameters, data, etc. For example, the illustrated example stores a problem space definition 172, constraints 174 and a determined performance metric 176 in the memory 154, with the processor 152 implementing an HS point computation component 166 to use the data 172, 174 and 176 along with data or values 178 to compute a set of HS points 180.

The processor 152 further implements a guidance control policy computation component 168, as further described with reference to FIG. 3 below, which uses the current location 164 and selected target location 162 and the HS points 180 along with the problem space 172, constraints 174 and performance metric 176 to compute a guidance control policy 170 which is then provided to the weapon guidance system 160 for open or closed-loop control of the missile which is then translated to the target. As further seen in FIG. 15, moreover, the memory 154 further stores a set of uncertain parameters "p", including parameters of interest 182 (which may include some or even all parameters associated with the problem space 172), as well as one or more statistical distribution types 184, one or more statistical moments 186, one or more weighting values 188, and/or slack variable bounds 190 associated with a corresponding one of the parameters of interest 182.

Additionally, the memory 154 stores optional HS point keep-out zones 192 and a desired cost function 194 used for computing the HS points 180 by the component 166.

HS computation process 38 in FIG. 4 advantageously facilitates judicious sampling of neighboring states and parameters from a set of all possible states/parameter values that can be used to determine a robust guidance and control policy 170, with respect to the uncertainty in the system and/or environment as embodied by the set "p" of uncertain parameters 182. Moreover, the guidance and control policy 170 provides a single control trajectory that can be applied to the dynamical system defined in the problem space 172 regardless of the specific values of the parameters "p" and further a single control trajectory that may be optimized relative to a performance index measured with respect to the uncertainty embodied in set "p". Computation of the performance index associated with the methods of the present disclosure, moreover, is facilitated using a novel procedure for generating HS points. The HS points 180 in this regard, provide a computationally efficient means for discrete representation of the uncertainty in the parameters "p", which include any uncertain parameters pertaining to the system and/or environment and which may additionally include uncertainty (6 in FIG. 1) in the initial and/or final states (4 and 8 in FIGS. 1 and 2 above, corresponding to the current location 164 and the selected target location 162 in FIG. 15) associated to the problem 172, wherein disturbances can also be included by considering their effect as equivalent perturbations in the initial state 4. The guidance control policy computation method 30 in FIG. 3 begins at 32 with definition of the problem space 172, which provides a mathematical definition of the problem, including in one possible embodiment, a set of differential equations that define a dynamical model of the system to be controlled. The problem space 172 and other data described herein can be computed via the processor 152 and/or may be user defined via the user interface 158. In certain cases, such as a fairly well-defined weapons guidance system implementation as seen in FIG. 15, the problem space 172 may be preprogrammed (e.g., stored in the memory 154) into the system for repeated usage. In a typical example, this definition is given by a set of linear and/or nonlinear ordinary differential equations (ODEs) that involve both state variables, control variables and parameters. In the illustrated example, for instance, the equations may characterize the problem space in any suitable fashion, such as to characterize operation of a missile in traveling from a launch location to a target destination. This may include equations involving the characterization of the current location 164, such as accuracy parameters related to operation of the GPS-equipped or similar navigation system 156, as well as those of the final state (selected target location 162). In addition, state variables "X" and parameters "p" may form part of the problem space characterization 172 relating to operational characteristics of the missile itself, such as the amount of mass as a function of time and distance traveled considering fuel expenditure, aerodynamics, propulsion system performance, etc., as well as equations defining the medium through which the missile is traveling (e.g., air pressure, wind factors, etc.) and the like. In addition, the problem space equations 172 may further characterize the control variables, such as thrust and/or control surface deflections, used to launch and potentially guide the missile from the current location 164 to the target 162.

The disclosed procedures encapsulate concepts of optimal robust control to design feasible guidance and control strategies that can be employed in the presence of statistical and other system disturbances, which can reduce or minimize the errors associated with these disturbances. An example of the problem space definition at 32 in FIG. 3 involves providing a dynamical model for the missile system to be controlled as a set of K differential flows governed by a common mapping $f: \mathbb{R}^N \to \mathbb{R}^N$, and indexed by a collection of system parameter vectors, $\vec{p}_k$. In the missile example, each differential flow represents the time-evolution of the dynamical model for the missile system for different initial conditions and/or values of the system parameters. In one possible implementation, the problem space definition 172 is a set of state space equations of the following form:

$$\vec{\dot{x}}_k = \vec{f}(\vec{x}_k, \vec{u}, t; \vec{p}_k), k=0, \ldots, K$$

where $\vec{x}_k(t) \in \mathbb{R}^{N_x}$ is the vector of system states over time, associated to $\vec{p}_k$ $\vec{u}(t) \in \mathbb{R}^{N_u}$ is the vector of system controls over time $\vec{p}_k \in \mathbb{R}^{N_p}$ is a set of system parameters For each k, k=0, ..., K, the system evolves through time in a manner dependent on the explicit value of the k-th parameter vector, $\vec{p}_k$, subject to a common control policy, $\vec{u}(t)$. This information may be assembled as:

$$\vec{F}(t) = \begin{bmatrix} \vec{F}_0(t) \\ \vec{F}_1(t) \\ \vdots \\ \vec{F}_K(t) \end{bmatrix} = \begin{bmatrix} \vec{f}(\vec{x}_0(t), \vec{u}(t), t; \vec{p}_0) \\ \vec{f}(\vec{x}_1(t), \vec{u}(t), t; \vec{p}_1) \\ \vdots \\ \vec{f}(\vec{x}_K, \vec{u}(t), t; \vec{p}_K) \end{bmatrix}$$

One differential flow described in the equation above corresponds to the behavior of the nominal system, wherein the nominal parameters for the system, $\vec{p}_0$ are used. For k=0, where the value of k depends on the distribution of its points for the nominal state, one example assumes a non-empty manifold of admissible guidance policies that meet all desired path and terminal constraints, $$\mathbb{U}_0 = \{\vec{u}(t, \vec{x}; \vec{p}_o), t \in [t_o \ t_f]\}.$$

Each element of the control policy $U_0$ drives the missile to a terminal constraint $\vec{e}(\vec{x}_0, \vec{x}_f, t_0, t_f; \vec{p}_0) = \vec{0}$ at some final or terminal time $t_f$ which may be fixed, free, or bounded, and where the initial time $t_o$ may, but need not, be fixed. The vectors of system parameters, $\vec{p}_k$, k=0, ..., K, are general, and can include, but are not limited to, items such as initial states, final states, initial and final times, environmental parameters, etc.

The differential flows, $F_k(t)$, t=1, ..., K describe the behavior of the dynamical system for off nominal parameter vectors, $\vec{p}_k$, k=1, ..., K, and may be assembled as $$\vec{P}(t) = \begin{bmatrix} \vec{F}_1(t) \\ \vec{F}_2(t) \\ \vdots \\ \vec{F}_K(t) \end{bmatrix} = \begin{bmatrix} \vec{f}(\vec{x}_1(t), \vec{u}(t), t; \vec{p}_1) \\ \vec{f}(\vec{x}_2(t), \vec{u}(t), t; \vec{p}_2) \\ \vdots \\ \vec{f}(\vec{x}_K(t), \vec{u}(t), t; \vec{p}_K) \end{bmatrix}$$

At 34 in FIG. 3, bounds are established for each of the system variables. These bounds in certain embodiments may represent practical limitations of the dynamical system or constraints imposed by the operator of the dynamical system. All of the variables that define the dynamical system are constrained to be in a general set, which in principle can be either finite or (mathematically) infinite. For example, the constraint definition at 34 may include defining bounds on the allowed set of initial conditions 4, final conditions 8, system parameters "p", and/or state/control constraints, referred to as en-route or path constraints 174. In one possible non-limiting embodiment, a nominal initial state 4 may be assumed, with an associated set of parameters, for example $|x_i(t_0)| \leq b_i$, i=1, ..., N, with bounds $b_i$ and $|p_k| \leq B$, k=1, ..., K, having a (component-wise) bound B. In certain implementations, these bounds can be set at 32 large enough so as to be non-binding and thus not limiting in the selection of the HS points. It is also preferable that all trajectory bounds be identified and set at 32, where the path constraints may restrict one or both of the possible state values X and/or the possible controls U, and are preferably also identified early in the process.

At 36, the objective index or performance metric 176 ("J") is defined or otherwise established for the guidance and control policy 170. In one embodiment, the performance metric 176 takes into account the evolution of all the differential flows. One non-limiting example will seek to reduce or minimize the stochastic uncertainty of the terminal state (i.e. the deviation from the selected target location 162 in FIG. 15 and point 8 in FIGS. 1 and 2), for example by computing the trace of the terminal covariance. That is, obtain a guidance and control policy 170 that minimizes J=trace($\wp(t_f)$), where $\wp(t)$=cov(x(t)) is the time varying covariance of the nominal state. In another possible embodiment, the user may seek to minimize the integrated trace of the covariance, i.e. j=∫trace($\wp(t)$)dt. The former metric 176 favors minimizing terminal system uncertainty, whereas the latter attempts to minimize uncertainty over the entire trajectory.

For both of the exemplary performance metrics 176 described above the continuous covariance of the nominal state is computed, by the methods and procedures of this disclosure, as the covariance of the discrete data in $\vec{P}(t)$ as described by the HS points at each time instant of interest as $\wp(t)$=cov($\vec{P}(t)$). By utilizing the covariance, the exemplary performance metric is seen to employ a $2^{nd}$ order statistical measure of the state variations due to uncertainty. Other choices, including those utilizing higher-order statistics can be selected to meet any suitable mission requirements for a given application. In addition, non-statistical metrics may be utilized. In one example, a performance index which minimizes a measure of terminal spread from the nominal target is given by:

$$J = \sum_{k=1}^{K} L_k, \text{ where } L_k \geq 0 \text{ and}$$

$$-L_k \leq x_k^j(t_f) - x_0^j(t_f) \leq L_k \text{ with}$$

$$\vec{x}_k(t) = \begin{bmatrix} x_k^1(t) \\ \vdots \\ x_k^{N_x}(t) \end{bmatrix}$$

At 38 in FIG. 3, a set of HS points 180 is computed via the HS point computation component 166 implemented by the processor 152 in FIG. 15, where the computed HS points 180 are consistent with the operator's understanding of the statistical properties of the uncertain parameters of the initial states, etc. as discussed further below in connection with FIG. 4. It is noted that any suitable set of points 180 may be used at 38 (including HS points and/or sigma points and/or arbitrary points or any combination thereof), wherein FIG. 4 illustrates a preferred implementation using HS points 180. In addition, the selection of the points 180 at 38 may be made in view of the desired performance index determined at 36.

With the points determined at 38, a guidance and control policy 170 is computed at 40 in FIG. 3, for instance, via the guidance control policy computation component 168 implemented using the processor 152 in FIG. 15. In this regard, the computed control policy 170 in certain implementations preferably optimizes the performance index over the entire set of differential flows as determined by the selected values of nominal and HS points determined at 38, relative to the performance index J 176 chosen at 36. In certain implementations, the guidance control policy may be determined analytically (when possible) or numerically, for example, via the processor 152. Any appropriate numerical technique can be used to solve this problem, including without limitation Shooting/Multiple-shooting, Genetic algorithms, Multi-objective programming, Dynamic programming, Co-location methods, and/or the use of direct pseudospectral methods. In any numerical implementation, however, it is desirable to reduce the total number of differential flows that are considered in order to improve the efficiency of the computation. This aspect is facilitated, in part, through the use of HS points which provide a process for sampling the domain of uncertainty in a manner which gives the desired accuracy of statistics with the smallest number of sample points. In addition, the process 38 of FIG. 4 for computation of the HS points enables the user of the process the ability to trade statistical accuracy against the desired number of HS points for any given problem.

The process 38 of FIG. 4 for computing HS points advantageously provides a novel computational technique that is an improvement over the prior art, in the following ways: applies to arbitrary distributions, relaxes the moment-matching concept and uses this relaxation as one of the factors that is used to select the HS points, allows user selection of the desired number of HS points, allows HS point keep-out zones, i.e. regions in state-space that will not be allowed to contain HS-points, and is entirely numerical in nature. In this regard, other approaches have used so-called sigma points (a particular subset of general HS points) to enhance the effectiveness of navigation filters, wherein the sigma points are employed to better predict the evolution of uncertainties in the future (at the next sampled observation). In contrast, the present disclosure, and exemplary embodiments provided herein, advantageously applies the concept of HS points to the problem of guidance and control or other state space transition problems in general. In this regard, navigation problems typically involve asking the question "Where am I?" In this context, uncertainty regarding the location of a vehicle, vessel, etc. is of primary concern, whereas guidance and control problems ask the question "How do I get there?" Thus, guidance and control problems seek to find the path and associated control commands that must be followed in order to transition the controlled system from the initial state to the desired final state in a way that reduces the error between the actual terminal point and the desired target. Previous guidance and control techniques are based on developing a control policy for a nominal plant comprising only nominal parameters and initial conditions, etc., wherein the effect of system uncertainty is evaluated (if at all) after the fact by the application of Monte-Carlo or similar methods to test the efficacy the proposed guidance policy. Other so-called robust control approaches apply linearization techniques in an attempt to generate more robust guidance commands, using the concept of desensitization, in which uncertainties are linearized over the trajectory, and certain analyses employ some metric of the covariance as a measure of trajectory robustness. However, this approach may fail to perform as expected for the real nonlinear system, or may result in a conservative control policy in which some of the available performance envelope of the system cannot be utilized. In contrast, the present disclosure advantageously addresses the deleterious effects of uncertainty directly as part of the guidance and control design process by coupling the concept of HS points with the concept of ensemble control in the form of a compact collection of properly selected differential flows, and thus provides a novel, non-linear method for creating robust guidance and control commands 170 for uncertain dynamical systems, whether the illustrated missile navigation system or any transition of a dynamical system from an initial state 4 to a final state 8.

As seen in FIG. 4, one implementation of the HS point determination process 38 involves determining the number of parameters of interest at 41 (e.g., the parameters of interest 182 in FIG. 15 below). At 42, for each parameter of interest 182 identified at 41, a statistical distribution type is assigned (assumed or otherwise determined), for example, a uniform distribution, a Gaussian distribution, a Poisson distribution, a frequency distribution, or a binomial distribution in certain embodiments. At 43, certain embodiments further allow determination or setting of particular statistical moments to be considered for each of the identified parameters of interest 182. At 44 in FIG. 4, moreover, one or more weighting factors can be set for individual statistical moments so as to emphasize their influence when evaluating the performance metric J 36. The number of HS points to be considered is determined at 45. One or more bounds or keep-out zones 192 may be set at 46 in FIG. 4 for the set of HS points 180. At 47, at least one bound is optionally set on at least one slack variable for a corresponding statistical moment 186. A desired cost function 194 is determined at 48 for computing the HS points 180, and the processor 152 is used at 49 to solve a constrained non-linear programming problem to compute the HS points 180 at least partially according to the slack variable bound, the bounds or keep-out zones 192 for the HS points 180, and the cost function 194.

As seen in FIG. 4, once the desired objectives and constraints have been established in the process 30 of FIG. 3, sampling the space of uncertain parameters is done by the determination of a finite set of HS points. To illustrate the process, consider the case of a Gaussian Density function with mean and covariance zero and unity, respectively, and assuming f:$R^N \to R$ is a mapping from the a real N-dimensional space to the real line, the Gaussian expectation of this function is given by $$E[f(x)] = \int_{R^N} f(x)p(x; 0, 1)dx$$

where p(x;0,1) is the N-dimensional Gauss distribution density function. Expanding in a Taylor series about the mean (which is 0), gives the expectation of the function as:

$$E[f(x)] = f(0) + \sum_{n=1}^{\infty} \sum_{|\alpha|=n} \partial^\alpha f(0) E[x^\alpha]/\alpha!, \text{ where} \quad (1)$$

$$\alpha = (\alpha_1, \ldots, \alpha_n), |\alpha| = \sum_{i=1}^{N} \alpha_i, \text{ is a multi-index, where}$$

$$x^\alpha = x_1^{\alpha_1} \ldots x_N^{\alpha_N}$$

$$\alpha! = \alpha_1! \ldots \alpha_n!, \text{ and}$$

$$\partial^\alpha = \frac{\partial^{|\alpha|} f}{\partial^{\alpha_1} \ldots \partial^{\alpha_N}}$$

Evaluating this expectation operator by quadrature, it can be assumed that there exists a finite set of positive real weights $w_i$, and points, $x_i \in R^N$ such that:

$$E[f(x)] = \sum_i w_i f(x_i), \text{ from which it follows that} \quad (2)$$

$$E[f(x)] = f(0)\left(\sum w\right) + \sum_{j=1}^{\infty} \partial^\alpha f(0) \frac{\left(\sum_i w_i x_i^\alpha\right)}{\alpha!}. \quad (3)$$

The following then provides the moment constraint equations whose embodiment may be described by lower and upper bounds on the weighted sum of monomials, given by:

$$-L_\alpha \leq \sum_i w_i x_i^\alpha - E[x^\alpha] \leq U_\alpha, \text{ and } -L_w^i \leq w_i \leq U_w^i, \text{ with} \quad (4)$$

$$L_\alpha, U_\alpha, L_w^i, U_w^i \geq 0$$

The lower and upper bounds may both be set to zero for all moments up to a desired order (precise moment matching), and higher order moments of interest may be either ignored, or the next higher order may be placed into a performance index to be minimized. In certain embodiments, the bounds may be chosen by taking into account different mission requirements. For example, if some of the moments are known precisely, then the bounds can be set to zero. The box-bounds on those moments which are less well understood can be loosened in certain implementations. As is known, a moment is a quantitative measure of the shape of a set of points, wherein the first moment is the mean, the second moment can be seen as a measure of the width of a set of points in one dimension, or in higher dimensions measures the shape of a cloud of points as it could be fit by an ellipsoid. Other moments describe other aspects of a distribution, for instance, skewing of the distribution from the mean, where a given distribution may be characterized by a number of features (e.g., mean, variance, skewness, etc.) related to the moments of a probability distribution for a random variable.

In certain embodiments, non-linear programming concepts can be used to calculate a given finite number of HS points, including all moments of interest, via the HS point computation component 166 implemented via the processor 152 in FIG. 15. In one implementation, a cost function J 194 (FIG. 15) may be used for determining the HS points 180, which cost function 194 is given by the following equation:

$$J = C + \sum_\alpha k_\alpha \left( \sum_i w_i x_i^\alpha - E[x^\alpha] \right)^2, |\alpha| \leq N = \text{the maximum} \quad (5)$$

statistical order of interest, and where $k_\alpha \geq 0$ is a tuning parameter that specifies confidence in knowledge of the moments, thus creating a weighted sum over all moments of interest, subject to the constraints identified above, and $C = C(x_1, i=1, \ldots, N_p)$ measure additional non-moment matching conditions, e.g., C may be any additional cost component that, by construction has the effect of minimizing the maximum magnitude of the computed HS points The construction of the cost function, specifically the use of tuning parameters, $k_\alpha$, and the lower and upper bounds on the weighted sum of monomials (either of which can be set arbitrarily by the user of the process) is a novel characteristic of the present disclosure and advantageously provides the flexibility needed to solve complex problems, using only a limited number of HS points 180. Some examples that can be obtained using process 38 of FIG. 4 are seen in Tables 2 and 3 below.

An example application is illustrated below, in the context of the classic Zermelo problem, to illustrate some key points related to the implementation of the presently disclosed techniques without the need to describe the complicated equations of motion associated with the exemplary missile guidance problem discussed above. In Zermelo's problem, it is desired to find how to navigate on a body of water by choosing a path to get from an initial location (initial state) to a final destination (terminal state) in the least possible time. The equations of motion for the dynamical system that describes the exact problem are given by:

$$\frac{dx}{dt} = Vu_x + py^3 \quad (6)$$

$$\frac{dy}{dt} = Vu_y \quad (7)$$

where $$u_x^2 + u_y^2 = 1$$

In this case, the state variables of the dynamical system are "x" and "y", the constrained control variables represent the cosine $u_x$, and sine $u_y$, of an angle, and the symbol "p" in this example is as an uncertain constant used to describe the strength of the current of the body of water. In the exemplary problem description current flows in the direction of the x-coordinate and has a strength that is proportional to the cube of the distance from the shore described by the line where y=0.

Beginning at an initial position or 'state' [$x_0$, $y_0$] with the objective to transition the boat to an origin [0, 0] (final state), a control policy 170 can be computed by assuming the nominal value of p and the nominal initial condition. The control policy for moving the boat may complete the transition from the initial state to the final state in minimum time, or with minimum effort in two possible non-limiting examples. However, deriving a guidance control policy 170 in this manner (specifically by selecting only the nominal value for p and only the nominal initial condition) may fail to achieve the final desired state in the presence of uncertainty in the value of p and/or in the values of the initial conditions. The present disclosure provides techniques for computing a guidance control policy 170 which is most robust with respect to this uncertainty according to the defined performance index, and thus will reduce the errors caused by uncertainty. To illustrate, the HS points in three dimensions are used, assuming that both the initial condition and the parameter p are uncertain. In this case, it is assumed without loss of generality, that the errors are described by a Gaussian probability distribution with a specified mean and variance. The nominal parameters and their uncertainties are seen in Table 1 below, and can be construed as being rather large, for example for cases of fog with GPS malfunctions.

TABLE 1

Nominal parameters and their uncertainty for the exemplary Zermelo problem

|    | Nominal Parameters | 1-sigma uncertainty |
|----|--------------------|---------------------|
| Xo | 2.25               | 0.1                 |
| Yo | 1.00               | 0.2                 |
| p  | 10.00              | 1.0                 |

A collection of HS points in three dimensions which match moments up to order 3, was obtained by the process 38 of FIG. 4 and their values can be seen in Table 3 below. These HS points may be employed in the Zermelo problem to generate six discrete values for each uncertain parameter (two (2) initial conditions Xo and Yo and the parameter p describing the current strength) which enable the statistics on the terminal state to be computed via a discrete collection of seven differential flows, one flow describing the nominal system and 6 flows describing the evolution of the off nominal system equations for the 6 sets of uncertain parameters. The raw HS points (Table 3) are first transformed into the used HS points. This is accomplished in this example by multiplying the matrix of raw HS points by one of the square-roots of the assumed covariance of the parameters of interest. There are many possible choices of square root for a positive definite symmetric matrix, such as a covariance. In the case of an uncorrelated Gaussian system, the initial covariance is diagonal, with the squares of the 1-sigma uncertainty values along the diagonal; in this instance, a natural square root is the diagonal matrix with the diagonal entries composed of the 1-sigma uncertainties.

$$HS_{used} = \begin{pmatrix} x_0^{nom} \\ y_0^{nom} \\ p^{nom} \end{pmatrix} + \sqrt{\text{cov}(x_0, y_o, p)} \begin{pmatrix} HS_{11} & HS_{12} & HS_{13} & HS_{14} & HS_{15} & HS_{16} \\ HS_{21} & HS_{22} & HS_{23} & HS_{24} & HS_{25} & HS_{26} \\ HS_{31} & HS_{32} & HS_{33} & HS_{34} & HS_{35} & HS_{36} \end{pmatrix} \quad (8)$$

and $$HS_{ij} = \text{the } i_{th} \text{ component of the } j_{th} \text{ computed HS point} \quad (9)$$

Other transformations of the HS points are possible. In the current example, assuming that the parameter covariance matrix is uncorrelated, the covariance square root is computed as the diagonal matrix composed of the one-sigma values given in Table 1. The values of the used HS points as computed based on the raw HS points (Table 3) are displayed in Table 2 below.

TABLE 2

Used HS Points in Zermelo Example

|  | X(1) | X(2) | X(3) |
|---|---|---|---|
| HSUsed P(1) | 2.12805 | 0.96074 | 11.21422 |
| HSUsed P(2) | 2.37195 | 1.03926 | 8.78578 |
| HSUsed P(3) | 2.16671 | 0.77474 | 8.98136 |
| HSUsed P(4) | 2.33329 | 1.22526 | 11.01864 |
| HSUsed P(5) | 2.15950 | 1.26022 | 9.30140 |
| HSUsed P(6) | 2.34050 | 0.73978 | 10.69860 |

Figure 5:
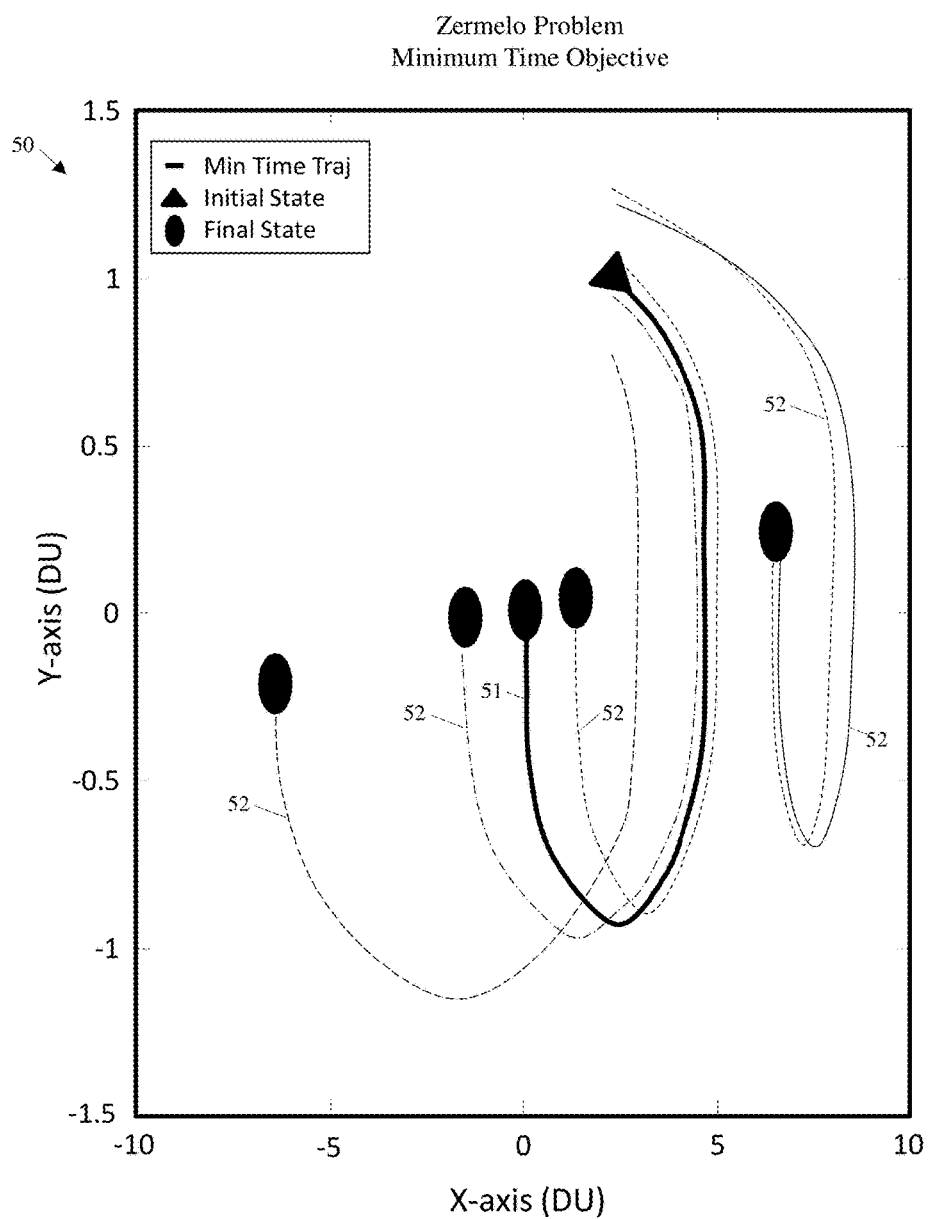
FIG. 5 is a graph illustrating exemplary minimum time state trajectories for a Zermelo problem with uncertainty.
Figure 6:
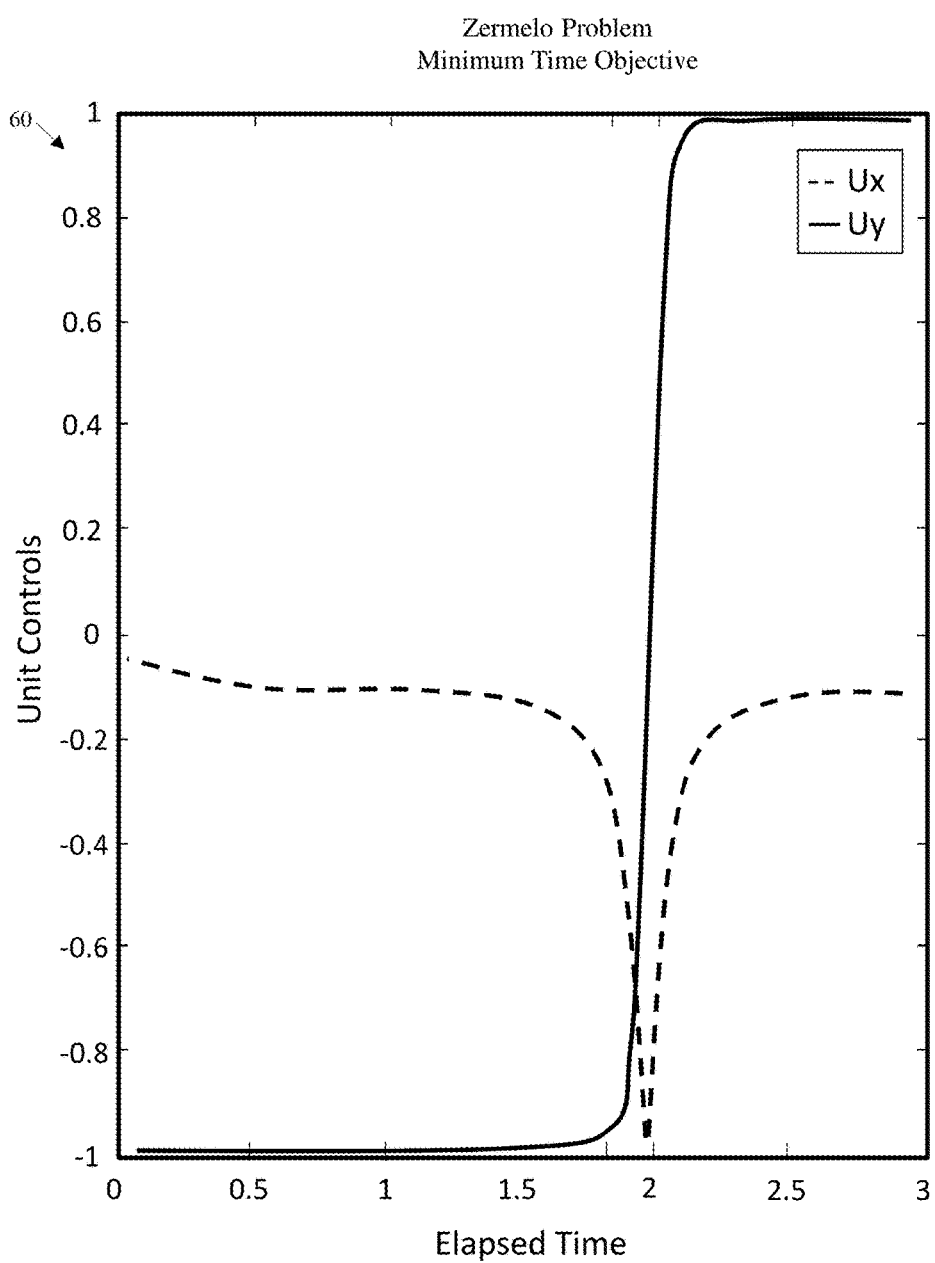
FIG. 6 is a graph illustrating exemplary minimum time control trajectories for a Zermelo problem with uncertainty.

As seen in the graph 50 of FIG. 5, the nominal boat (origin) is properly driven to the target zero location via the minimum time trajectory 51 as a consequence of applying the minimum time control trajectories $u_x, u_y$ seen in the graph 60 of FIG. 6. The off-nominal trajectories 52 in FIG. 5 are given by the differential flows corresponding to the HS points using the same control policy given in FIG. 6. Since the control policy was derived based on the nominal parameters only, it is seen that the trajectories of the boat diverge significantly from the desired terminal point (0, 0) as a consequence of the domain of parameter uncertainty as embodied by the HS points.

Figure 7:
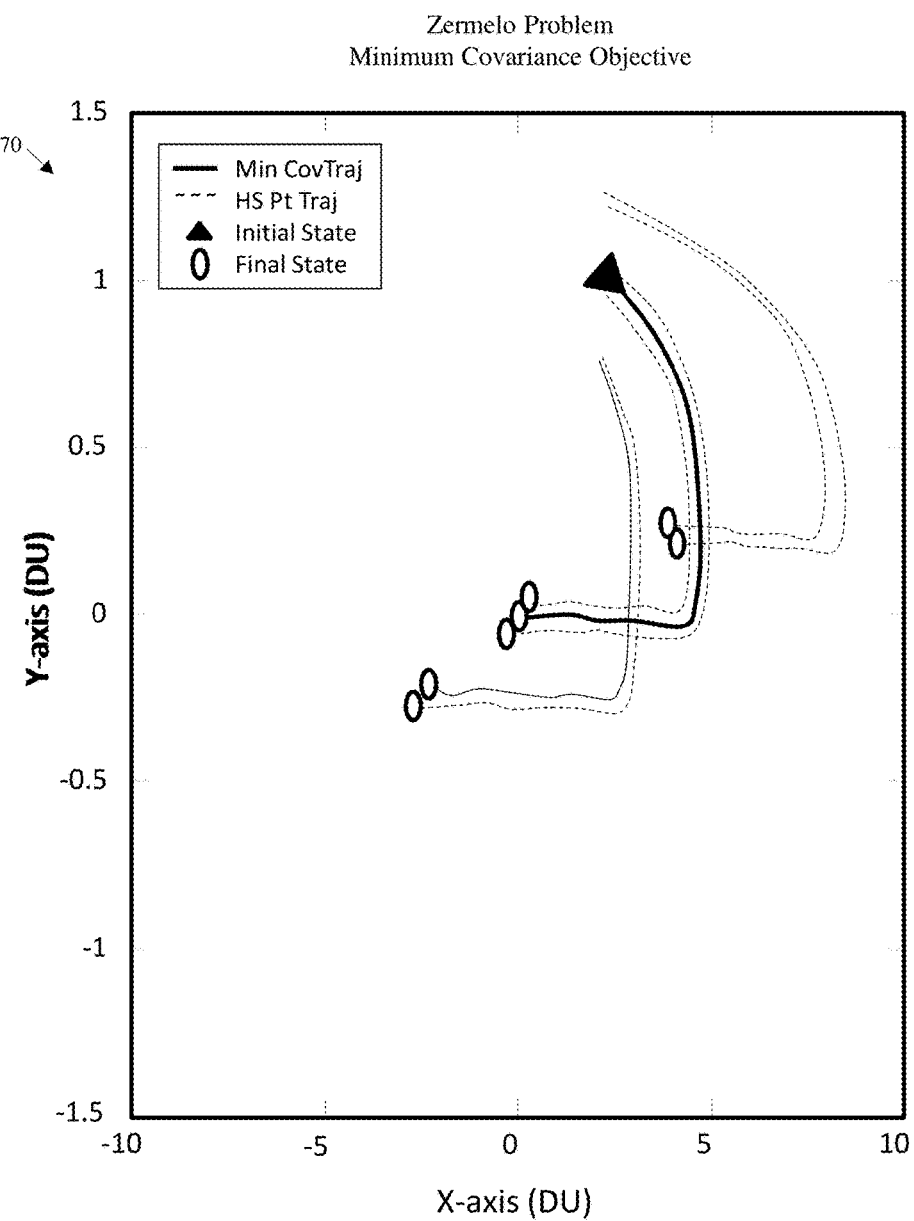
FIG. 7 is a graph illustrating exemplary state trajectories for the Zermelo problem using a minimum terminal uncertainty control policy obtained using the method of this disclosure.
Figure 8:
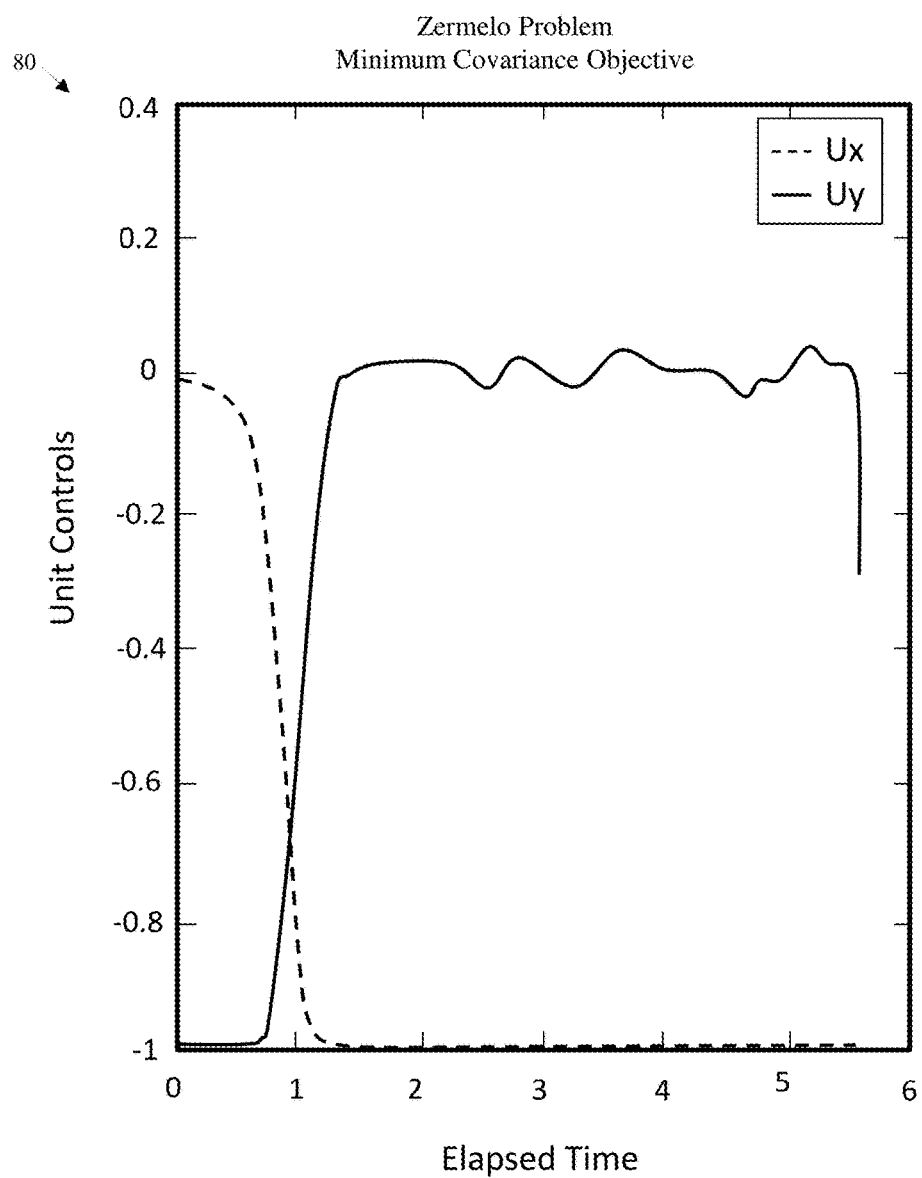
FIG. 8 is a graph illustrating exemplary control trajectories for a Zermelo problem using minimum terminal uncertainty control policy obtained using the method of this disclosure.

The concepts of the present disclosure may be employed to advantageously reduce or minimize the uncertainty associated with such terminal dispersions, i.e. the dispersion of the final states in FIG. 5. Using this as the objective of our desired control policy, and applying the method of the present disclosure, a significantly different set of "boat" trajectories is achieved, as seen in the graph 70 of FIG. 7. The new control policy obtained through the application of the disclosure is seen in the graph 80 of FIG. 8. The control policy is determined by minimizing the trace of the terminal uncertainty covariance matrix, which can be computed from the HS point weights as follows:

$$\sum_{k=1}^{N_p} w_k [\vec{x}_k(t_f) - M][\vec{x}_k(t_f) - M]^T \quad (10)$$

where $$M = E(\vec{x}_k(t_f), k = 1, \ldots, N_p) \equiv \sum_{k=1}^{N_p} w_k \vec{x}_k(t_f) \quad (11)$$

Figure 9:
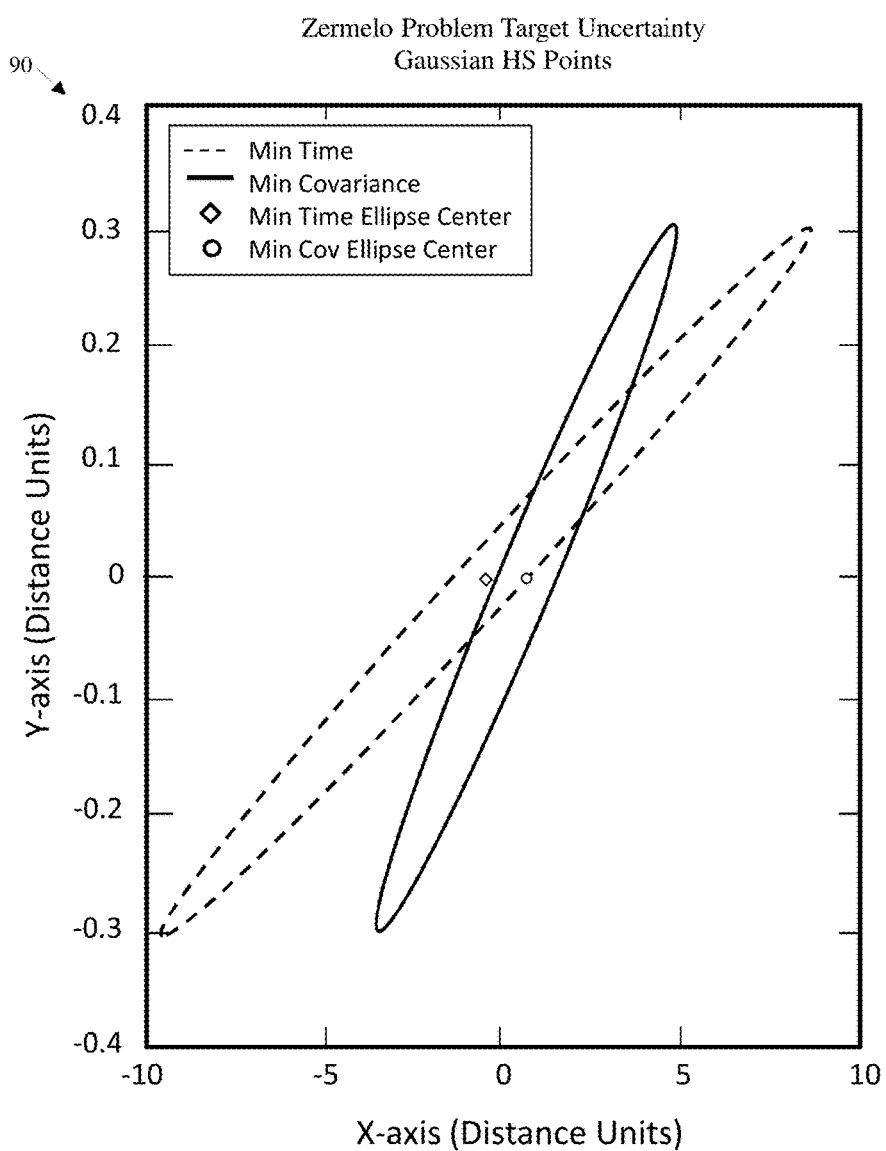
FIG. 9 is a graph illustrating an exemplary terminal uncertainty comparison.
Figure 10:
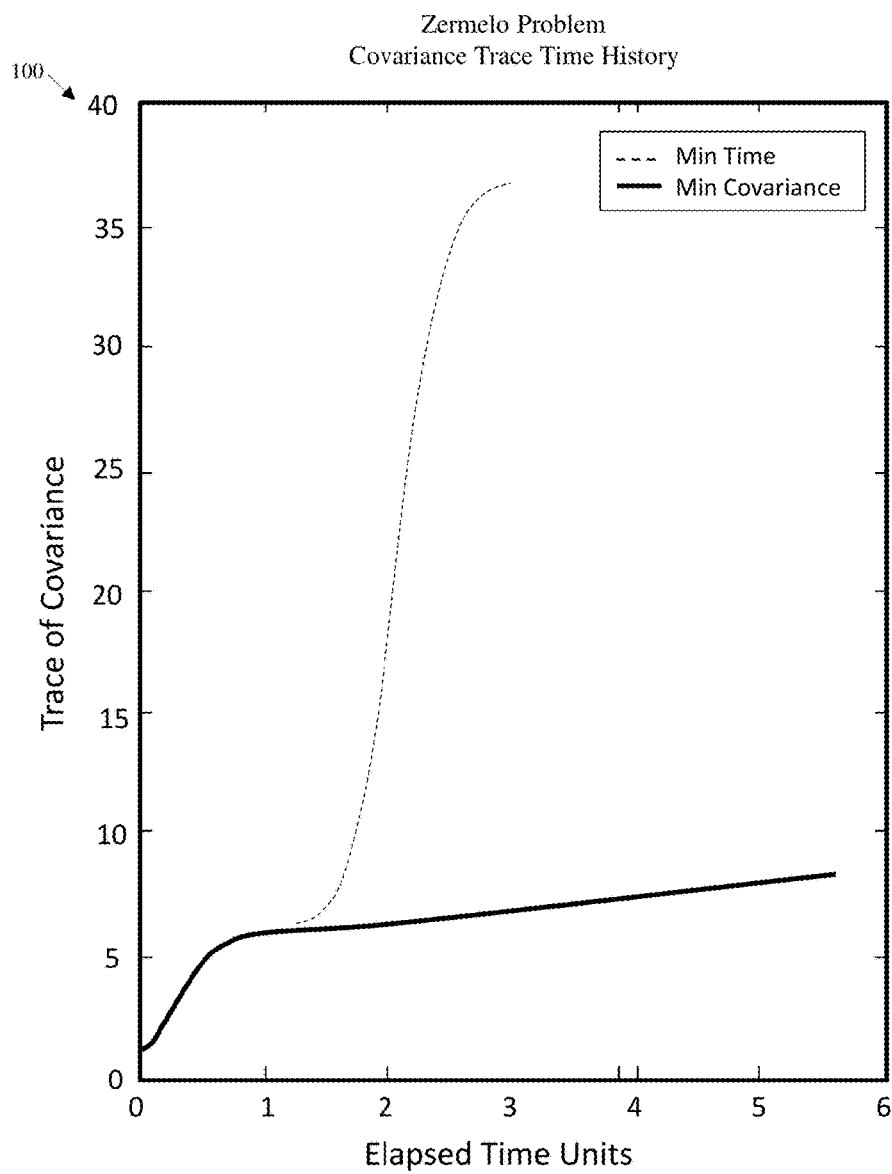
FIG. 10 is a graph illustrating exemplary covariance time histories.

For example, with respect to the one-sigma uncertainty ellipses portrayed in the graph 90 of FIG. 9, the 1-sigma uncertainty ellipse associated with the policy that minimizes the trace of the terminal uncertainty covariance matrix (computed by applying the method of the present disclosure) has a semi-major axis significantly smaller than the uncertainty ellipse associated with the control policy computed using the minimum time metric and only the nominal values for the initial conditions and parameter. The trace of the covariance can be measured during the boat trajectory, where the graph 100 in FIG. 10 illustrates this measure for both the Minimum Time (conventional) and Minimum Uncertainty (using the method of the present disclosure) control policies. In this case, it is seen that the Minimum Time covariance trace diverges dramatically from the Minimum Uncertainty covariance trace exactly when the Minimum Uncertainty controls "flip", as can be seen in the graph 80 of FIG. 8. The control policy provided using the concepts of the present disclosure generates this flip precisely at the point in time that minimizes the terminal uncertainty. Thus, considering the effects of the uncertainty as part of the computation of the control policy using the approach described herein has the desired effect of reducing the uncertainty in the terminal state.

Another example application is illustrated below in the context of a spacecraft attitude control problem, to illustrate some additional key points related to the implementation of the presently disclosed techniques. In particular this example focuses on the effectiveness of the present disclosure in reducing terminal uncertainty associated with a large angle rigid body slew maneuver. The equations of motion for the dynamical system that describes the exact problem are given by:

$$I_x \frac{dw_x}{dt} = u_x - (I_z - I_y)w_y w_z \quad (12)$$

$$I_y \frac{dw_y}{dt} = u_y - (I_x - I_z)w_x w_z \quad (13)$$

$$I_z \frac{dw_z}{dt} = u_z - (I_y - I_x)w_x w_y \quad (14)$$

$$\frac{dq_1}{dt} = \frac{1}{2}(+w_x q_4 - w_y q_3 + w_z q_2) \quad (15)$$

$$\frac{dq_2}{dt} = \frac{1}{2}(+w_x q_3 + w_y q_4 - w_z q_1) \quad (16)$$

$$\frac{dq_3}{dt} = \frac{1}{2}(-w_x q_2 + w_y q_4 - w_z q_1) \quad (17)$$

-continued $$\frac{dq_4}{dt} = \frac{1}{2}(-w_x q_1 + w_y q_2 - w_z q_3) \quad (18)$$

where $1 = q_1^2 + q_2^2 + q_3^2 + q_4^2$ with $|u_x| \leq 1$, $|u_x| \leq 1$, and $|u_x| \leq 1$ In this case, the seven (7) state variables of the dynamical system are the body rotation rate, $\vec{w} = [w_x \quad w_y \quad w_z]^T$, and the body attitude unit quaternion, $\vec{q} = [q_1 \quad q_2 \quad q_3 \quad q_4]^T$.

The control vector $\vec{u} = [u_x \quad u_y \quad u_z]^T$ is bounded component wise by unity. The inertia tensor is assumed to be diagonal, scaled to unity:

$$I = \begin{bmatrix} I_x & 0 & 0 \\ 0 & I_y & 0 \\ 0 & 0 & I_z \end{bmatrix} = \begin{bmatrix} 1 & 0 & 0 \\ 0 & 1 & 0 \\ 0 & 0 & 1 \end{bmatrix},$$

with the three diagonal elements being the selected as the constant parameters of the problem and, with each constant parameter having a 1 sigma uncertainty equal to 0.01. In this example problem, the uncertain parameters are the diagonal elements of the inertia tensor. Beginning at an initial rest state, $w(t_o)=[0,0,0]^T$, $q(t_o)=[0,0,0,1]^T$ the objective is to transition, (or slew) the rigid body to a final attitude, also at rest, with terminal conditions given by $w(t_f)=[0,0,0]^T$, $q(t_f)=[0.7233170.439680-0.3604230.391904]^T$. A control policy 170 can be computed to achieve the objective in minimum time, or minimum effort, or some other non-limiting metric. However, deriving a guidance control policy 170 in this manner may fail to achieve the final desired state in the presence of uncertainty. The present disclosure provides techniques for computing a guidance control policy 170 which is most robust with respect to the considered uncertainty in the spacecraft inertia tensor, and thus will reduce the errors caused by this uncertainty. To illustrate, HS points in three dimensions which match up to the $5^{th}$ order are used. Again, it is assumed without loss of generality, that the errors are described by a Gaussian probability distribution. The normalized values of the order 5 HS points can be seen in Table 4 below.

In addition to the nominal case, the HS points give rise to 13 differential flows that can be used to describe the influence of the parametric uncertainty on the behavior of the rigid body system and hence allow statistics on the terminal performance to be evaluated. The concepts of the present disclosure may therefore be employed to advantageously reduce or minimize the dispersion of the final states. This is demonstrated graphically in FIGS. 16-23 which illustrate the pairwise covariance between the system states i.e. between the rotation rates, and between the quaternion components with one feasible minimum time guidance policy 170, denoted as "Feas1" versus a guidance policy 170 employing the methods and techniques of the present disclosure to minimize the terminal uncertainty, denoted as "MinU". The error ellipse for the "Feas1" solution in these figures is displayed with dash-dot ellipse. The error ellipse for the "MinU' is displayed by the dotted ellipse. It can be seen that both the rate and attitude error uncertainty is significantly improved by the methods and techniques employed by the present disclosure. It is also worthwhile to note that although only a small set of 14 differential flows were used in the computation of the guidance control policy, the statistics on the terminal states as computed based on the final states of each of the 13 off-nominal differential flows are in agreement with a Monte Carlo analysis in which more than 1000 randomly selected points was used to evaluate the performance of the computed guidance control policy. This aspect illustrates the advantageous use of a comparatively small set of HS points as obtained by the methods of the present invention to accurately model the statistics at the terminal state.

Figure 11:
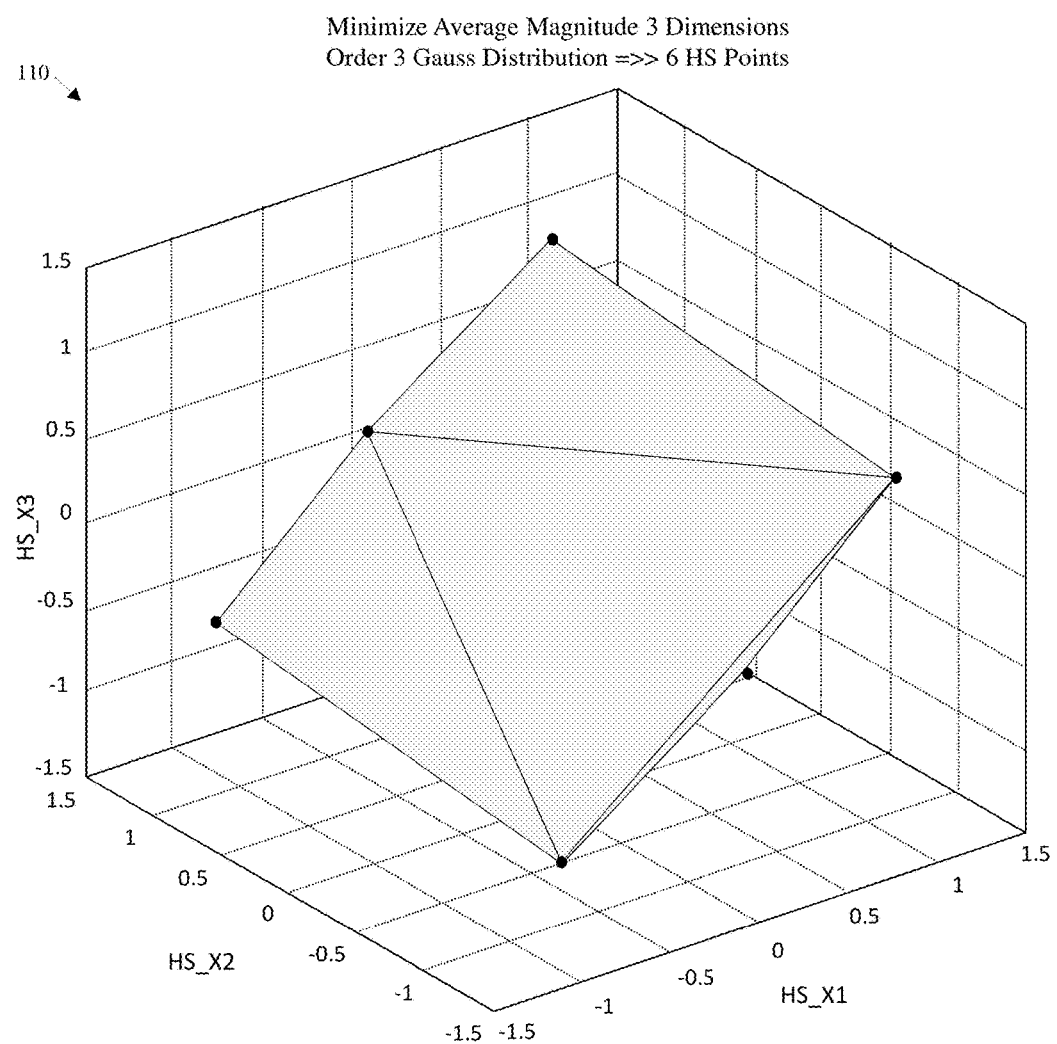
FIG. 11 is a three dimensional illustration of $3^{rd}$ order HS points for Gaussian distributions obtained by the process of FIG. 4.
Figure 12:
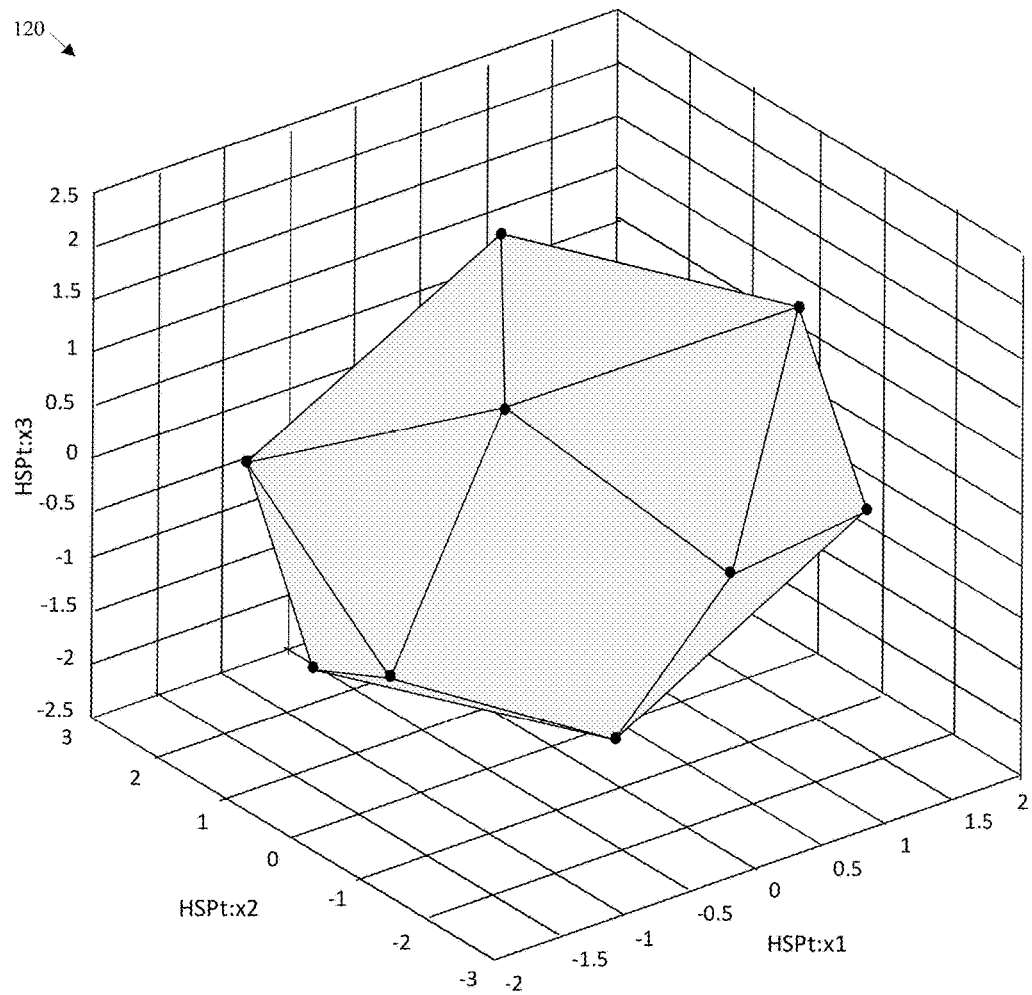
FIG. 12 is a three dimensional illustration of $5^{th}$ order HS points for Gaussian distributions obtained by the process of FIG. 4.

Referring also to the graphs 110 and 120 in FIGS. 11 and 12, the present disclosure provides techniques that may facilitate systematic creation of HS points 180, weighing the choice by an objective or cost function 194 which is tailored to the application at hand. In the example below, HS points in three dimensions may be generated using the procedure described in the following. The slack-bounds on the moment constraint objectives are set to zero up to and including the order of interest, for example order 3 (110 in FIG. 11) or order 5 (120 in FIG. 12). Such a setting on the moment constraint objectives ensures precise matching of the statistical moments up to and including the specified order. In this example, an additional objective, (which is now the only binding one) minimizes the average size of the squared lengths of the HS points. The final constrained objective function in this example, denoted as $J_{avg}$, is expressed as:

$$J_{avg} = \sum_{i=1}^{N_p} x_i x_i^T + \sum_{\alpha} k_\alpha \left( \sum_{i=1}^{N_p} w_i x_i^\alpha - E[x^\alpha] \right)^2 \quad (19)$$

with bounds $L_w^i, U_w^i, L_\alpha, U_\alpha \geq 0$ $-L_w^i \leq w_i \leq U_w^i$, with $L_w^i = 0$, $U_w^i = 1$, for $i = 1, \ldots, N_p$, and $L_w^i = 0, U_w^i = 1, \forall i$ $-L_\alpha \leq \sum_{i=1}^{N_p} w_i x_i^\alpha - E[x^\alpha] \leq U_\alpha$, for each multi-index $\alpha$, with $|\alpha \leq 3|$ and $L_\alpha = U_\alpha = 0$ In certain non-limiting examples, (such as the present one), minimizing the average size of the squared lengths of the HS points makes the values of the components of the HS points more desirable from the point of view of numerical stability. Similar objectives might include minimizing the maximum magnitude of the computed HS points. As seen in FIG. 11, HS points for three dimensions (assuming a Gaussian distribution along each dimension) match all moments up to and including order 3, and have minimum average length. Matching up to order three is imposed by solving the associated non-linear programming problem. In this case, the resulting HS points form an octahedron in 3-dimensions. The HS points, their weights and their lengths are shown in Table 3 below, where the length of each HS point is the square root of 3 and the weights are all equal to the numerical value ⅙.

TABLE 3

HS Points in Three Dimensions for Order 3 Moment Matching (Gaussian Probability Distribution Assumed).

| | X(1) | X(2) | X(3) | Weight | Length |
|---|---|---|---|---|---|
| HS P(1) | −1.219477 | −0.196310 | 1.214223 | 0.166667 | 1.732051 |
| HS P(2) | 1.219477 | 0.196310 | −1.214223 | 0.166667 | 1.732051 |
| HS P(3) | −0.832933 | −1.126323 | −1.018636 | 0.166667 | 1.732051 |
| HS P(4) | 0.832933 | 1.126323 | 1.018636 | 0.166667 | 1.732051 |
| HS P(5) | −0.905040 | 1.301099 | −0.698601 | 0.166667 | 1.732051 |
| HS P(6) | 0.905040 | −1.301099 | 0.698601 | 0.166667 | 1.732051 |

As shown in FIG. 12, HS points that match all the statistical moments up to the order 5 may be generated in another example using the same kind of objective and constraints as described above. Further, the average length of the points is minimized using the process of the present disclosure. One of the HS points lies at the origin, [0, 0, 0] and the remaining 12 form a regular Icosahedron. As shown in Table 4 below, all of the non-zero HS points have exactly the same length, i.e., 2.23607, which in this case is the square root of 5, and the same weight which is equal to the numerical value 1/20. The weight corresponding to the HS point at the origin has a numerical value equal to 2/5.

TABLE 4

HS Points in Three Dimensions for Order 5 Moment Matching (Gaussian Probability Distribution Assumed).

| | X(1) | X(2) | X(3) | Weight | Length |
|---|---|---|---|---|---|
| HS P(1) | 0.00000 | 0.00000 | 0.00000 | 0.40000 | 0.00000 |
| HS P(2) | 0.18884 | −2.22428 | −0.13007 | 0.05000 | 2.23607 |
| HS P(3) | −1.33576 | 0.97973 | −1.50196 | 0.05000 | 2.23607 |
| HS P(4) | −1.83955 | −1.12709 | −0.58797 | 0.05000 | 2.23607 |
| HS P(5) | −0.18884 | 2.22428 | 0.13007 | 0.05000 | 2.23607 |
| HS P(6) | 1.00399 | 1.18462 | −1.60894 | 0.05000 | 2.23607 |
| HS P(7) | 1.33576 | −0.97973 | 1.50196 | 0.05000 | 2.23607 |
| HS P(8) | 1.83955 | 1.12709 | 0.58797 | 0.05000 | 2.23607 |
| HS P(9) | −1.94624 | 0.79556 | 0.76106 | 0.05000 | 2.23607 |
| HS P(10) | 1.94624 | −0.79556 | −0.76106 | 0.05000 | 2.23607 |
| HS P(11) | −1.00399 | −1.18462 | 1.60894 | 0.05000 | 2.23607 |
| HS P(12) | −0.01621 | −0.88664 | −2.05271 | 0.05000 | 2.23607 |
| HS P(13) | 0.01621 | 0.88664 | 2.05271 | 0.05000 | 2.23607 |

Figure 13:
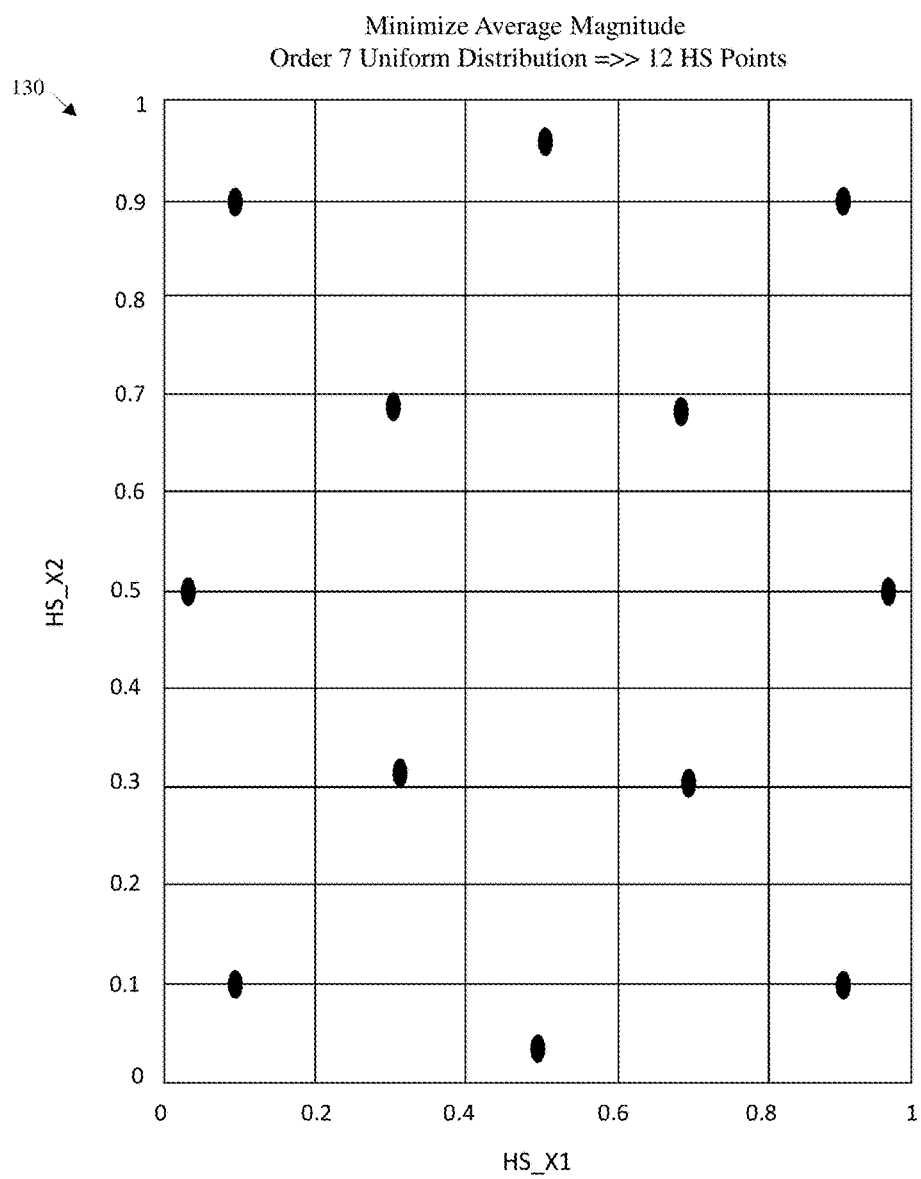
FIG. 13 is a graph illustrating 12 exemplary $7^{th}$ order HS points for a 2-dimensional uniform distributions obtained by the process of FIG. 4.
Figure 14:
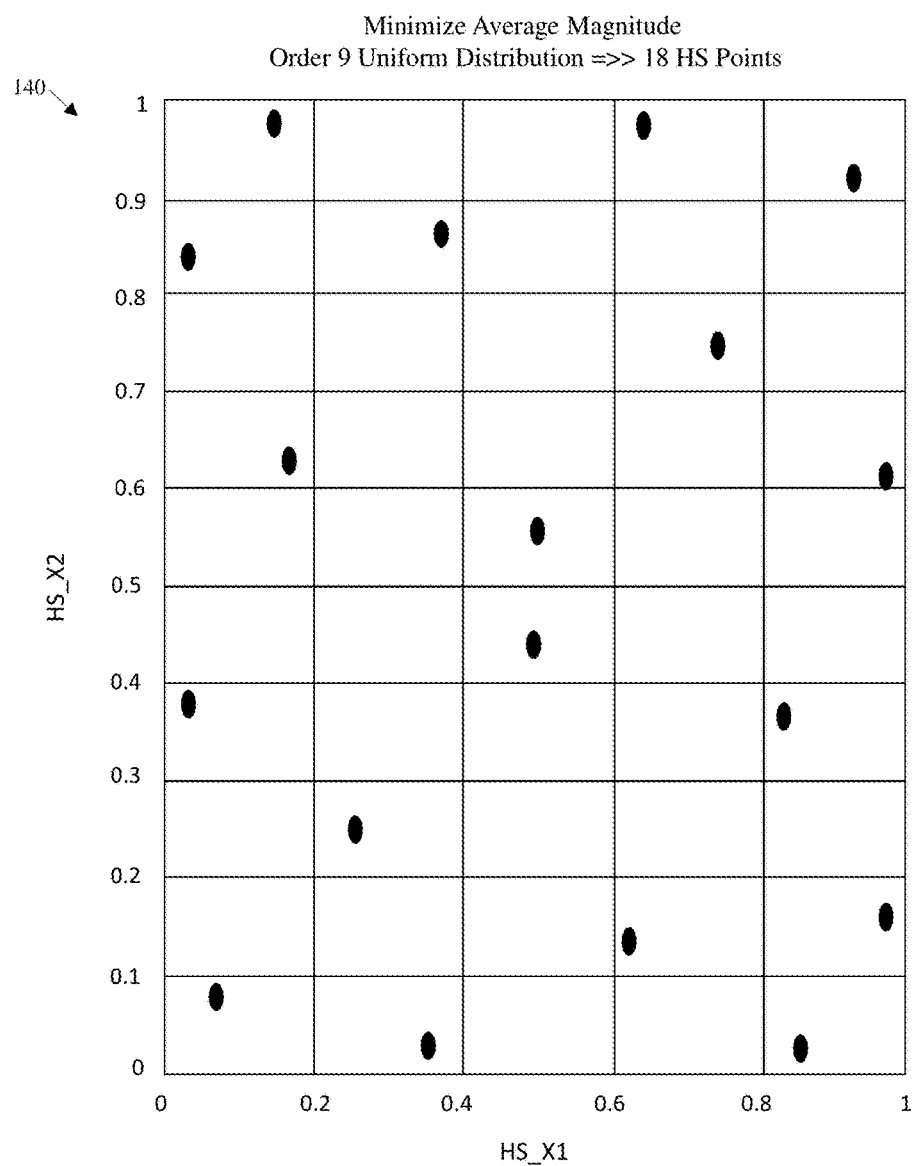
FIG. 14 is a graph illustrating 18 exemplary $9^{th}$ order HS points for a 2-dimensional uniform distributions obtained by the process of FIG. 4.

FIG. 13 illustrates a graph 130 showing HS Points in two dimensions for order 7 moment matching assuming a uniform probability distribution along each dimension, and the graph 140 in FIG. 14 shows HS Points in two dimensions for order 9 moment matching assuming a uniform probability distribution along each dimension. The method of the present disclosure for computation of HS points is applicable to any statistical distribution, and thus is not limited to Gaussian or Uniform distributions as outlined in the examples herein. The method of the present disclosure additionally applies to distributions with both bounded and unbounded domains. For example, using the same objective that has been described above, and using the method of this disclosure, both $7^{th}$ order and $9^{th}$ order HS point sets, (on two variables) are displayed in FIG. 13 and FIG. 14, respectively. The $7^{th}$ order system of HS points of FIG. 13 precisely matches all statistical moments up to and including order seven using only 12 HS points, whereas the $9^{th}$ order system in FIG. 14 precisely matches all statistical moments up to and including order 9 using 18 HS points. Thus, statistics having accuracy up to the $7^{th}$ order may be computed by sampling the domain of uncertainty using only 12 points in the case of FIG. 13. Referring again to the guidance control policy computation 40, the set of 12 HS points given in FIG. 13 can be employed to generate 12 differential flows (in addition to the nominal flow) that describe the behavior of a dynamical system in the state space given uniform parametric uncertainty in two dimensions. Moreover, since the statistics given by the HS points given in FIG. 13 match moments up to the $7^{th}$ order, the performance index 36 utilized as part of the guidance control policy generation can utilize any or all combinations of statistical measures up to the $7^{th}$ order moment. This aspect is a distinguishing feature of the method of the present disclosure for robust state space control of uncertain dynamical systems. A similar discussion also holds for the order 9 HS points given in FIG. 14. Using the methods of the present disclosure, the computation of the HS points takes into account the creation of the HS points subject to problem specific objectives and constraints, and the illustrated HS points are related to a particular instantiation of the disclosed concepts and are constructed only as illustrative examples.

Figure 25:
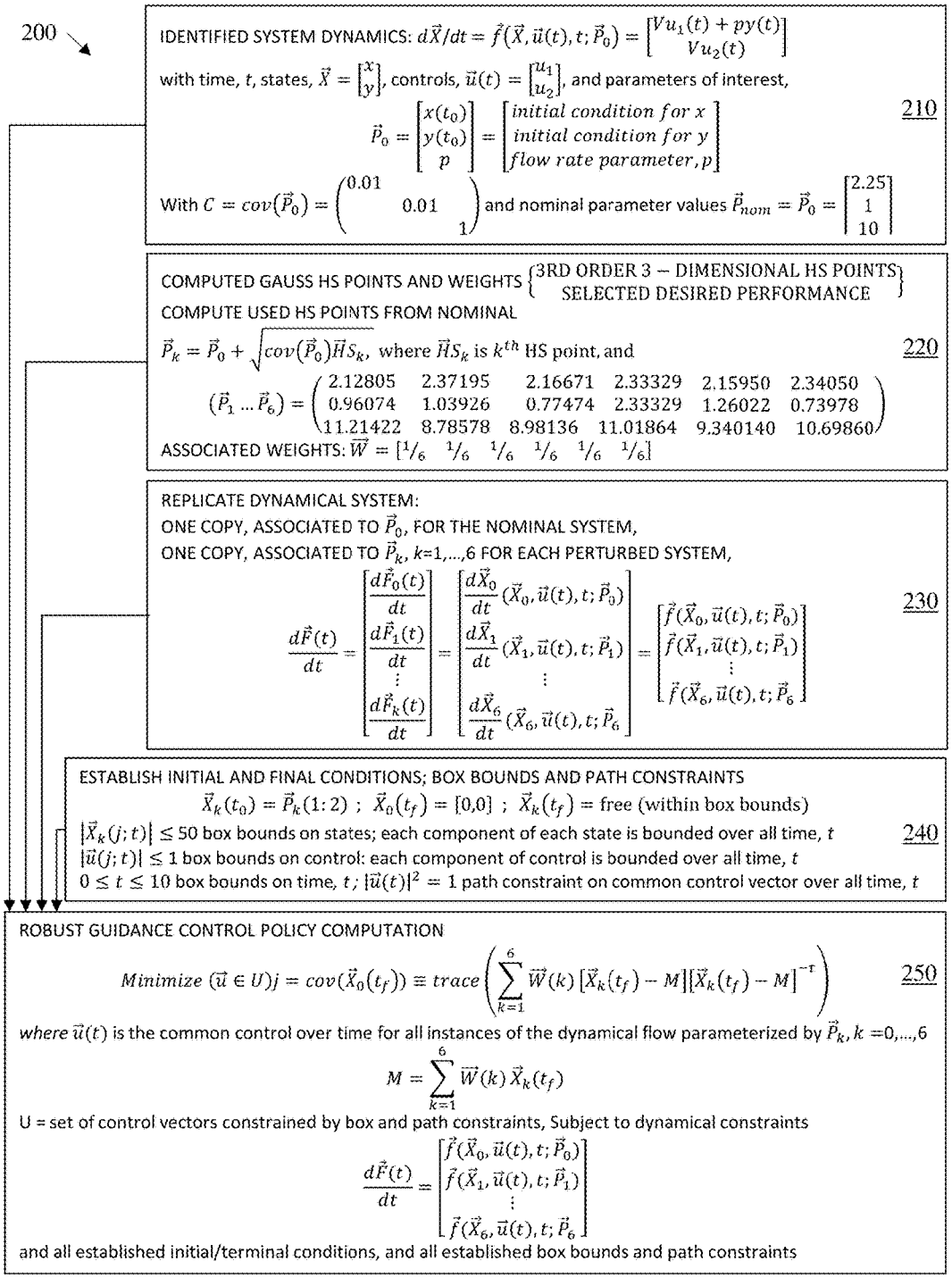
FIGS. 25 and 26 are exemplary diagrams illustrating robust trajectory determination and computation of HS points in accordance with the present disclosure.
Figure 26:
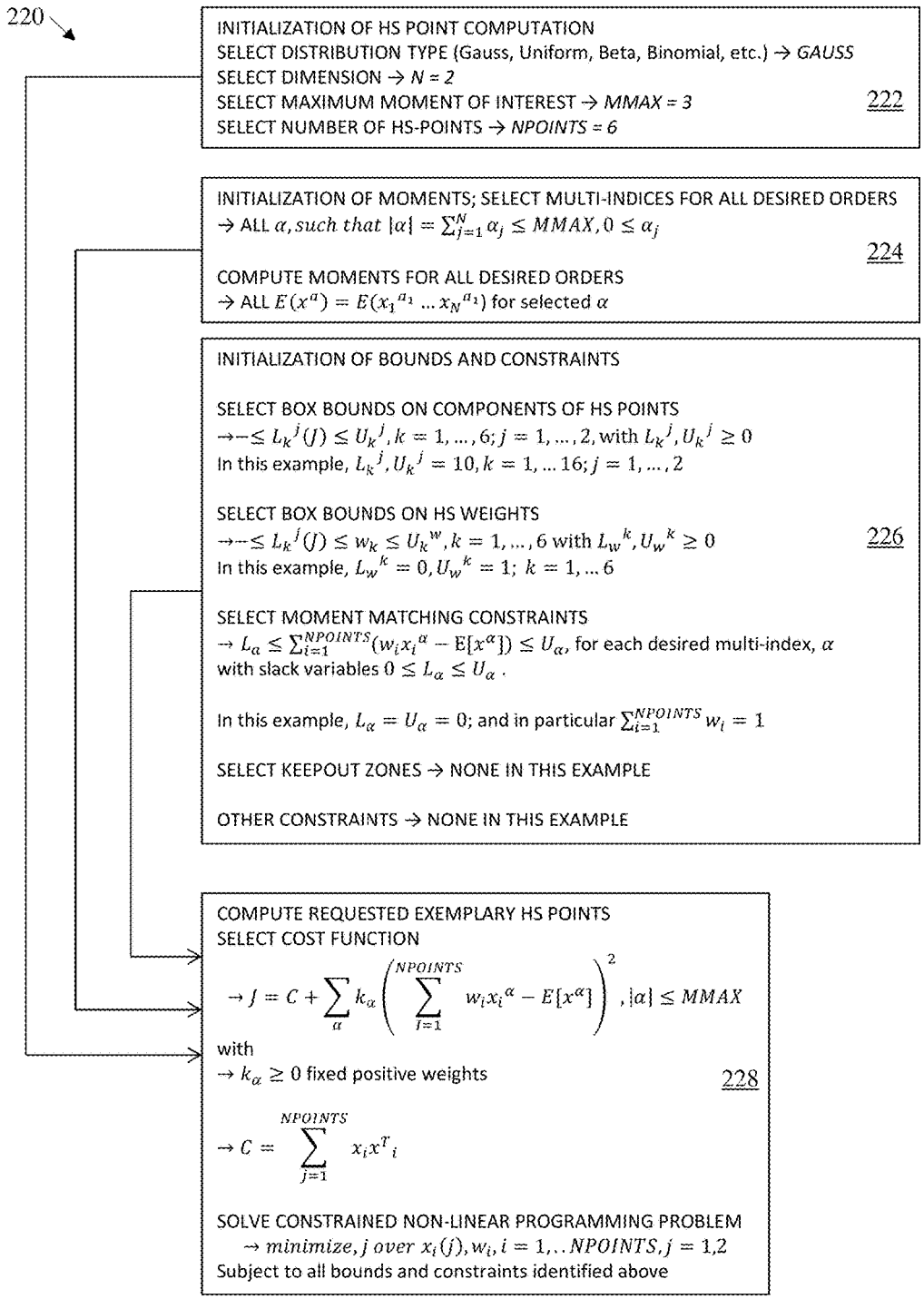

FIGS. 25 and 26 illustrate examples of robust trajectory determination 200 and HS point computation 220, for the described Zermelo problem, according to the present disclosure. Application of the method of the present disclosure is similar to the exemplary implementation shown in FIGS. 25 and 26 for other general problems in which it is desired to transition an uncertain dynamical system from an initial state through a state space to a final state while minimizing or reducing the effects of uncertainty. Moreover, the equations and computations illustrated in FIGS. 25 and 26 may be implemented using any suitable processor or processors in certain implementations, such as processor 152 in FIG. 15 in one non-limiting example. The trajectory determination 200 of FIG. 25 includes identification at 210 of system dynamics which are provided to a robust guidance control policy computation component 250. In addition, Gauss HS points and weights are determined via component 220 and provided to the guidance control policy computation component 250. A collection of dynamical system models is constructed via component 230 in which the collection of dynamical system models includes at least one dynamical system model corresponding to the nominal parameter values and/or initial conditions or at least one dynamical system model corresponding to the uncertain parameters as represented by samples of the considered domain of parameter uncertainty. Initial and final conditions, box bounds, and path constraints are determined via component 240, with the results being provided to the robust guidance control policy computation component 250. FIG. 26 illustrates further details of one implementation of the HS point computation 220, in which the HS point computation is initialized via component 222, with the initialized components being provided to an HS point computation component 228. Component 224 provides for initialization of moments, and bounds and constraints are initialized via component 226, with the results being provided to component 228 for computation of the requested exemplary HS points.

Figure 27:
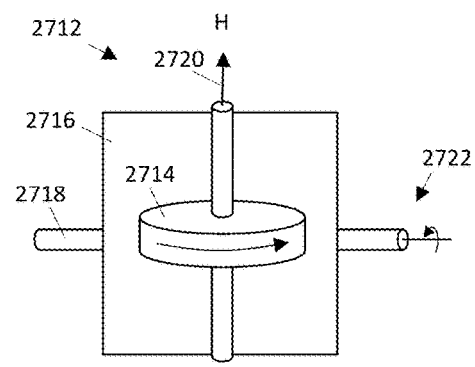
FIG. 27 illustrates an exemplary diagram of a control moment gyroscope (CMG).
Figure 28:
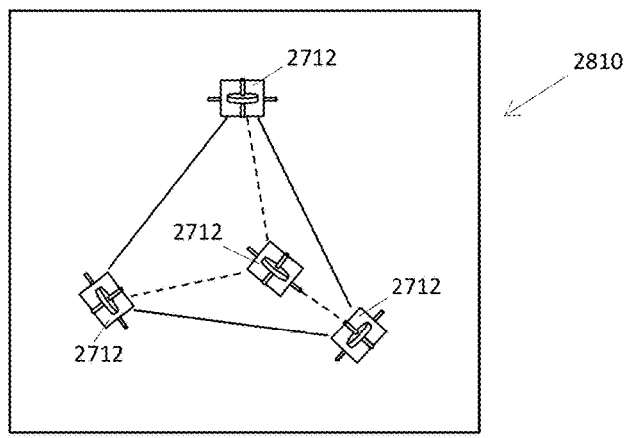
FIG. 28 illustrates an exemplary diagram of a plurality of CMGs arranged so that the gimbal axis of each CMG points in a different direction.

FIGS. 27-33 illustrate an exemplary application of the present disclosure to provide agile maneuvering of an imaging spacecraft 2810 controlled by a plurality of three or more control moment gyroscopes (CMGs) 2712 wherein each CMG 2712 has a gimbal axis pointing in a different direction. FIG. 27 illustrates an exemplary diagram of a control moment gyroscope (CMG) 2712. In FIG. 27, a CMG 2712 includes a rotor 2714 as well as a rotor housing 2716, a gimbal axis 2718 and a spin axis 2720 about which rotor 2714 rotates to store angular momentum. In operation, the angle of the gimbal of CMG 2712 is changed by rotating spin axis 2720 about gimbal axis 2718 to produce a rotational gimbal angle 2722. Changing the value of rotational gimbal angle 2722 changes the direction of the momentum vector H for a given CMG 2712 and this causes a torque to be applied to rotate a spacecraft. FIG. 28, illustrates three or more CMGs 2712 arranged so that the gimbal axis 2718 of each CMG 2712 points in a different direction to control the attitude angles of a spacecraft 2810.

Figure 29:
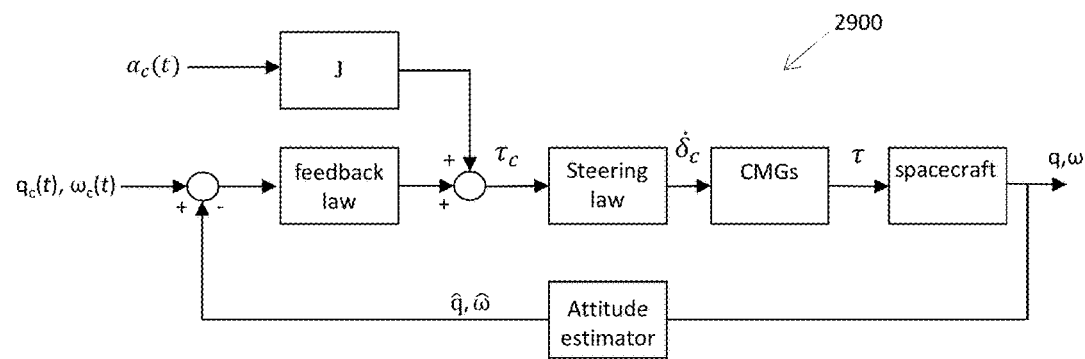
FIG. 29 illustrates a block diagram of a prior art feedback system for controlling the attitude of a spacecraft.

FIG. 29 illustrates a block diagram of a conventional feedback system 2900 for controlling the attitude of spacecraft, such as spacecraft 2810. Exemplary feedback system 2900 is comprised of an attitude estimator, a feedback law and a CMG steering law. Compensation of the gyroscopic terms is not shown but may be introduced as part of the control loop in a straightforward fashion by one skilled in the art. A feedback law provides a torque command, $\tau_c$, in the spacecraft body frame to drive the error between the commanded attitude and rate ($q_c(t)$ and $\omega_c(t)$) and the estimated attitude and rate ($\hat{q}$ and $\hat{\omega}$) to zero. Feedforward acceleration commands, $\alpha_c(t)$, may also be introduced as shown in FIG. 29. The role of the steering law is to allocate the commanded torque, $\tau_c$, amongst the individual CMGs 2712 in terms of a set of gimbal rate commands, $\dot{\delta}_c$. A key difficulty in utilizing a feedback system like the one shown in FIG. 29 for controlling the attitude of an imaging spacecraft is that the CMG steering law may become singular for some orientations of the CMG gimbals. In the singular condition, it is impossible to produce torque in the commanded direction, leading to attitude errors. If spacecraft 2810 is an imaging satellite such attitude errors may prevent the system from acquiring the desired image.

Figure 30:
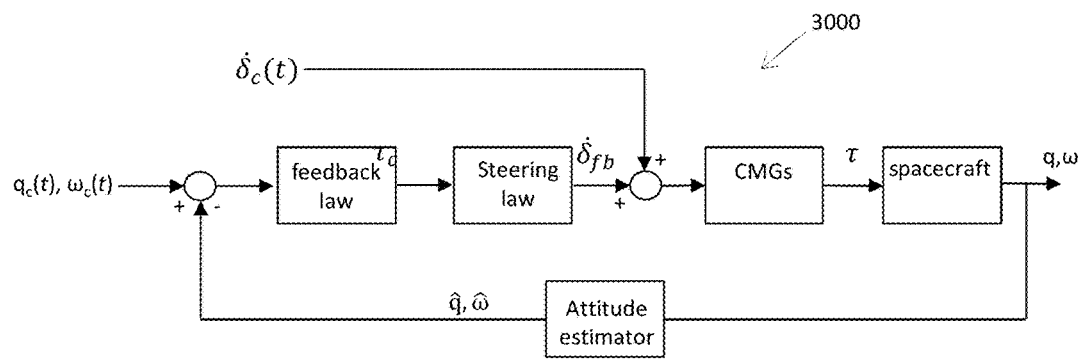
FIG. 30 illustrates a block diagram of a feedback system in which the gimbal rate feedforward commands may be used to drive the CMG gimbals directly without utilizing the feedback control system.

In an effort to overcome the problem of CMG singularities, feedback system 2900 can be rearranged as shown in FIG. 30 (3000). Gimbal rate feedforward commands, $\dot{\delta}_c(t)$, may be used to drive the CMG gimbals directly without utilizing the feedback control system. Nominal gimbal rate commands, $\dot{\delta}_c(t)$, are naturally obtained in the current state of the art by the computation of a standard guidance control policy. Guidance control policies obtained by existing approaches are, however, not amenable to operational implementation due to system uncertainties and other non-idealities such as modeling errors. In this context the open-loop solutions available using current approaches cannot be adequately implemented due to inaccuracies in the system model. Therefore, in a practical application, a guidance policy must be implemented using a feedback controller. Implementing a guidance policy using a feedback architecture is straight forward as guidance trajectories for the attitude and rate ($q_c(t)$ and $\omega_c(t)$) in FIG. 30 are also available in addition to gimbal rate commands, $\dot{\delta}_c(t)$, as part of the solution to a guidance policy computation problem.

Despite the apparent simplicity of the control loop in FIG. 30, the feedback implementation of a guidance policy can fail due to corrective actions, $\dot{\delta}_{fb}$, (resulting from the feedback steering law) that are incompatible with available guidance control commands. The failure is manifest in this exemplary problem as a reduction in the CMG similarity index, possibly to zero, from the expected nominal value. The CMG singularity index is one measure of the control authority of the CMG array. This problem can be resolved using the method of the present invention to obtain a new and different guidance control policy that specifically desensitizes the variation in the CMG singularity index to large perturbations in the orientations of the gimbals that may occur due to feedback. Using the method of the present invention, feedback authority can be explicitly reserved to counteract the effects of system uncertainties so that the new guidance control policy can be successfully implemented in a feedback setting.

Figure 31:
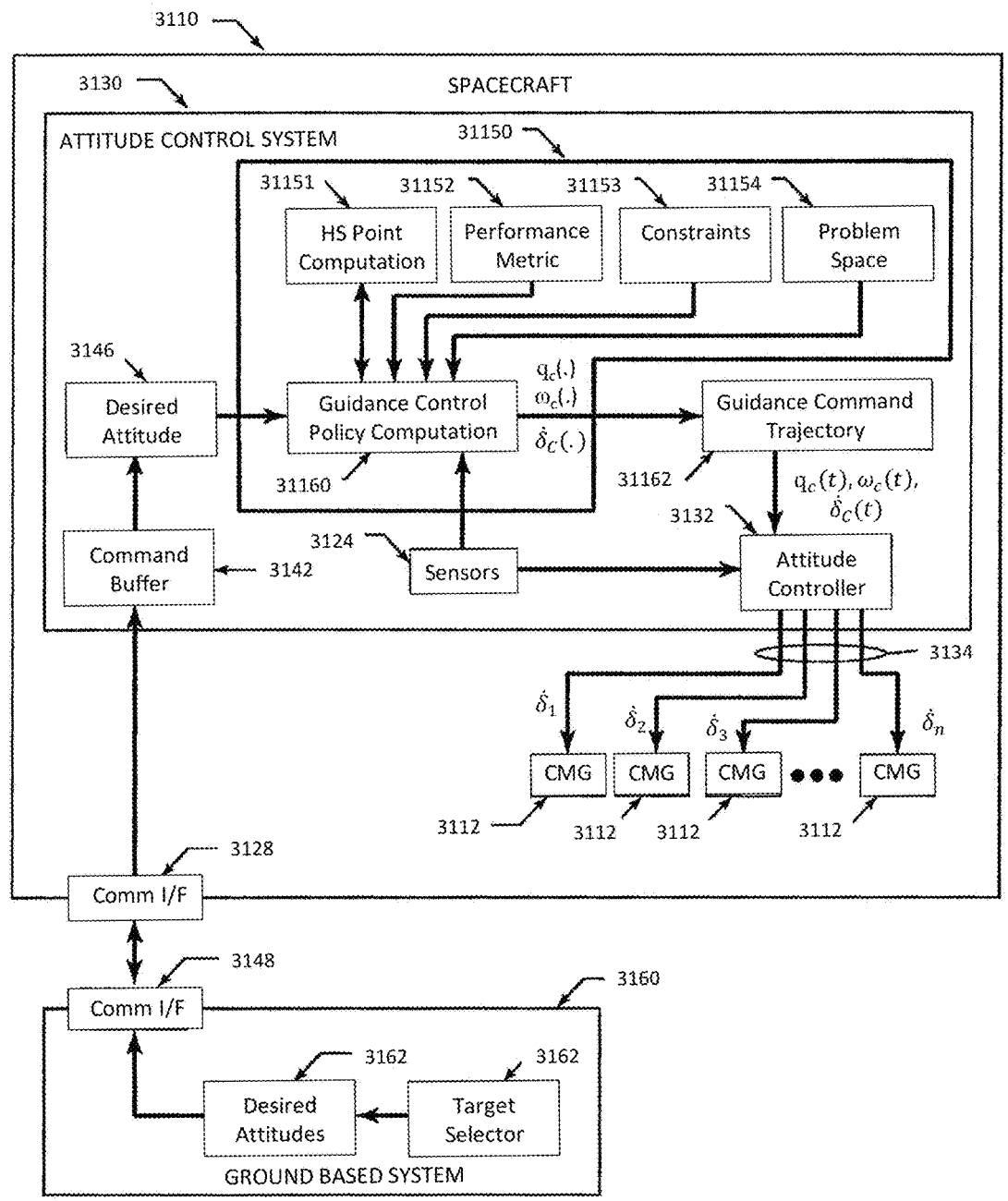
FIG. 31 illustrates one embodiment of a guidance control policy for an exemplary CMG spacecraft generated using the method of the present disclosure.

FIG. 31 illustrates a block diagram of one embodiment in which the method of the present invention is utilized to generate a guidance control policy for an exemplary CMG spacecraft, such as spacecraft 2810. In FIG. 31 the computation of a guidance control policy 31150 is done on board spacecraft 2810. In other embodiments, computation of a guidance control policy can be done as part of a process instantiated on a ground based system 3160. Referring to FIG. 31, the desired attitude of spacecraft 2810 may be given at instants in time as determined by a target selector 3161. Target selector 3161 uses an internal algorithm to determine the ideal utilization of the imaging sensor of spacecraft 2810. Desired attitude targets 3162 and their time tags are communicated to spacecraft 2810 over an appropriate communications interface 3148 and 3128. After being received at interface 3128 on spacecraft 2810, desired attitude targets and their corresponding time stamps are stored in a command buffer 3142 for subsequent execution by attitude control system 3130.

When a desired attitude target 3146 becomes active (as determined in one instantiation by comparing an attitude target time tag with a clock operated on board spacecraft 2810), an attitude target is read by the guidance control policy computation module 31150. The current location and attitude of spacecraft 2810 and other information related to the state of spacecraft 2810 is measured by sensors 3124 and made available to both the attitude controller 3132 which may implement a version of the control block diagram given in FIG. 30, and the guidance control computation block 31160 of the present invention. In order to determine an appropriate guidance command trajectory 31162 to achieve a desired attitude target the guidance control policy computation block 31160 makes use of problem specific information stored in a problem space module 31154, a constraints module 31153, and a performance metric module 31152.

For a rapid imaging satellite, it is advantageous to reduce the total maneuver time required to transition the imaging sensor of satellite 2810 from the current attitude as determined by sensors 3124 and the desired attitude 3146 at the current time. In this context, an appropriate performance metric 31152 is to minimize the final time of the maneuver $$J = t_f - t_o \qquad (20)$$

where in equation (20), $t_f$ is a final clock time of a maneuver and $t_o$ is an initial clock time.

To ensure that the problem is feasible for implementation by attitude controller 3132, N copies of a model of the spacecraft dynamics are needed to define the problem space stored in module 31154. One copy of a representative model is given as $$\dot{x} = \begin{bmatrix} \frac{1}{2}(q_4\omega - \omega \times q) \\ -\frac{1}{2}\omega^T q \\ J^{-1}\left\{-\omega \times \left(J\omega + R_p \sum_{i=1}^{n} h_i\right) - R_p A(\Delta)u\right\} \\ u \end{bmatrix} \quad (21)$$

where x is a vector of system states, q is a vector of quaternions, w is a vector of angular rates and J is a spacecraft inertia tensor. The elements of vector h are the individual momenta of CMGs 3112 projected into the body-fixed frame of spacecraft 3110. A rotation matrix Rp can be used as part of the projection mapping and A(D) is the CMG Jacobian matrix, which depends on the instantaneous values of gimbal angles 3122. Vector u is the control vector of individual gimbal rates.

In the absence of uncertainty in the dynamical model of spacecraft 2810, $\dot{\delta}_{fb}(t)=0$ in FIG. 30 when a guidance policy computed based on equation (21) is used as an input to attitude controller 3132. In a practical setting, it is possible for $\dot{\delta}_{fb}(t)\gg 0$ due to uncertainties. This discrepancy can lead to singularities due to a reduction in the control authority of a CMG array. To accommodate uncertainties via a feedback mechanism such as the one disclosed in FIG. 30, it is necessary to ensure that a margin for feedback is always retained. This can be done in one embodiment by adjusting a guidance control policy to ensure that the CMG singularity index always lies above a threshold, $S_{min}$, determined by an operator of spacecraft 2810. The CMG singularity index for an array of n CMGs is given by $$S(\Delta) = \sqrt{\det[A(\Delta)A^T(\Delta)]} \text{ where } \Delta(t) = [\delta_1(t), \delta_2(t), \ldots, \delta_n(t)]^T. \quad (22)$$

The precise nature of $\dot{\delta}_{fb}(t)$ is impossible to know in advance but can be easily approximated. For example, in one embodiment it is possible to model the value of the instantaneous gimbal angle of each CMG using a Normal distribution, $\mathcal{N}(\mu_i,\sigma^2)$ where $\mu_i$ is the nominal (mean) value of the gimbal angle 3122 for a CMG 3112 and $\sigma$ is the standard deviation from the mean (the statistical off-nominal perturbation induced by the feedback controller) that is presumed by an operator of spacecraft 3110. At each instant in time, statistics on $S(\Delta,t)$ can be computed as a multi-dimensional Riemann-Stieltjes integral. For example, the expected value of $S(\Delta,t)$ may be computed as $$E[S(\Delta,t)] = \int\int\ldots\int S(\delta_1(t), \delta_2(t), \ldots, \delta_n(t))d\Phi\left(\frac{\delta_1(t)-\mu_1(t)}{\sigma^2}\right) \quad (23)$$
$$d\Phi\left(\frac{\delta_2(t)-\mu_2(t)}{\sigma^2}\right)\ldots d\Phi\left(\frac{\delta_n(t)-\mu_n(t)}{\sigma^2}\right)$$

To ensure some margin for feedback (and thus avoid the possibility of encountering singularities) an advantageous operational constraint (which may be stored in constraint module 31153 is $$E[S(\Delta,t)]-3E[(S(\Delta,t)-E(S(\Delta,t))^2]\geq S_{min} \quad (24)$$

It is apparent that evaluation of equation (24) requires computation of higher-order expectations. Nonetheless, a guidance control policy that satisfies equation (24) ensures that the probability that the value of $S(\Delta,t)$ is greater than the operator selected threshold, $S_{min}$, 99% of the time. This is because the left hand side of equation (24) represents the mean value of the CMG singularity index minus 3 times the standard deviation of the CMG singularity index. Thus, the reliability of the feedback controller can be improved to nearly 100% by computing a guidance control policy that satisfies equation (24). Using the method of the present invention, efficient evaluation of equation (24) can be accomplished by evaluating HS points in module 31151 as per the disclosed procedure. As illustrated in Table 5, 5-th order HS points are sufficient in this example application because the first two central moments (necessary for accurate computation of equation 1624 have the correct values when compared to a benchmark Monte Carlo simulation. Because there are 23 5-th order HS points, N=23 copies of the dynamic equations given in equation (21) are needed to formulate the problem space 31154 of the exemplary guidance control policy computation problem.

TABLE 5

Estimated central moments of a typical singularity index PD.

| Central Moment | Monte Carlo (benchmark) | Sigma Points ($3^{rd}$-order) | HS Points ($5^{th}$-order) | HS Points ($7^{th}$-onder) |
|---|---|---|---|---|
| $\mu_1$ | 0 | 0 | 0 | 0 |
| $\mu_2$ | $+3.68 \times 10^{-2}$ | $+3.51 \times 10^{-2}$ | $+3.68 \times 10^{-2}$ | $+3.68 \times 10^{-2}$ |
| $\mu_3$ | $-2.71 \times 10^{-3}$ | 0 | $-2.86 \times 10^{-3}$ | $-2.74 \times 10^{-3}$ |
| $\mu_4$ | $+3.95 \times 10^{-3}$ | $+1.24 \times 10^{-3}$ | $+3.94 \times 10^{-3}$ | $+3.95 \times 10^{-3}$ |
| N-points | $10^6$ | 8 | 23 | 52 |

Other constraints implemented in constraint module 31153 include any operator-defined bounds on the values of the system states or controls, the quaternion norm condition and the conservation of angular momentum.

One formulation of an appropriate guidance policy computation problem is given below in equation (17). This is one example of a problem that may be stored or constructed in the problem space module 31154 to enable rapid slewing of a spacecraft 2810. Upon computation of a guidance control policy that satisfies all of the appropriate constraints using block 31160, a guidance command trajectory 31162 is then provided to attitude controller 3132 at the attitude controller sample rate, which in turn determines a vector of gimbal angle commands 3134 for commanding CMGs 3112 based on the guidance command trajectory and measurements of the state of spacecraft 3110 as measured by sensors 3124.

$P_{RS}(X_o, X_f)$: (25)

$$\begin{cases} \text{Minimize} & J[X(\cdot), u(\cdot), t] = t_f - t_0 \\ \text{Subject to} & \hat{x}_1 = f(x_1, u, t) \\ & \hat{x}_2 = f(x_2, u, t) \\ & \vdots \\ & \hat{x}_N = f(x_N, u, t) \\ & x_1^0 = [q(t_0), \omega(t_0), \Delta_1(t_0)]^T \\ & x_2^0 = [q(t_0), \omega(t_0), \Delta_2(t_0)]^T \\ & \vdots \\ & x_N^0 = [q(t_0), \omega(t_0), \Delta_N(t_0)]^T \\ & x_1^f = [q(t_f), \omega(t_f), \Delta_1(t_f)]^T \\ & \Delta_i(t_0) \sim N(\Delta_{nom}(t_0), \sigma^2 I_{4\times 4}) \\ & S_{min} \leq E[S(\Delta, t)] - 3E[(S(\Delta, t) - E[S(\Delta, t))^2] \\ & h(x, u, t) \leq 0 \end{cases}$$

To illustrate the advantageous nature of the method of the present invention, the block diagram of FIG. 31 was implemented on a commercially available spacecraft simulator. An experiment was implemented to demonstrate agile CMG maneuvers for a point-to-point image collection problem.

Figure 32:
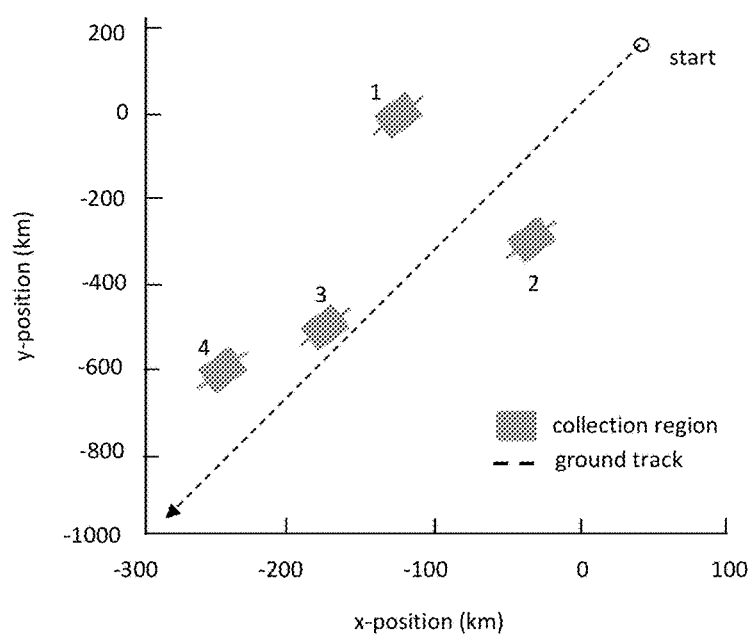
FIG. 32 illustrates a schematic of an exemplary path of a satellite boresight projected over the Earth for successful collection of four exemplary images.

A schematic illustrating an exemplary path of a satellite boresight (projected over the Earth) for successful collection of four exemplary images is shown in FIG. 32. In FIG. 32, each image collection region is denoted by a shaded area. In order to acquire the imagery product, it is necessary for a satellite boresight to traverse through the center of each collection region as shown by the solid red lines. Note that it in this representation, it is not necessary that the boresight traces extend beyond the shaded collection regions (as is shown for clarity of the illustration). Due to the relative motion between the Earth and a satellite moving along its ground track, performing an imaging task requires careful coordination of the satellite attitude and rate so that specified tolerances on the attitude and rate tracking error during imaging can be satisfied. Meeting these stringent requirements during imaging cannot be done in the open loop and is handled by the feedback controller. In order to facilitate rapid image acquisition it is ideal that the boundary conditions on each point-to-point maneuver are consistent with the attitude and rate conditions required for imaging each region. By designing the appropriate non-rest maneuvers using the method of the present invention, the transition between the maneuvering and imaging operations can be handled in a seamless fashion.

A sequence of agile maneuvers was designed using the method of the present invention wherein the problem formulation for guidance policy computation is given by equation (25). It was desired to maintain the total variation of the CMG singularity index above a threshold, $S_{min}=0.45$. The standard deviation of each CMG gimbal angle from nominal was assumed to be $\sigma=10°$. A guidance control policy computed by the method of the present invention will therefore provide gimbal angle trajectories where probability of $S(\Delta) < S_{min}$, due to feedback perturbations, will be small (<1%). The guidance control policy computed by the method of the present invention provides a statistically guaranteed margin for feedback so that singularities can be avoided even in the presence of system and model uncertainty.

Figure 33A:
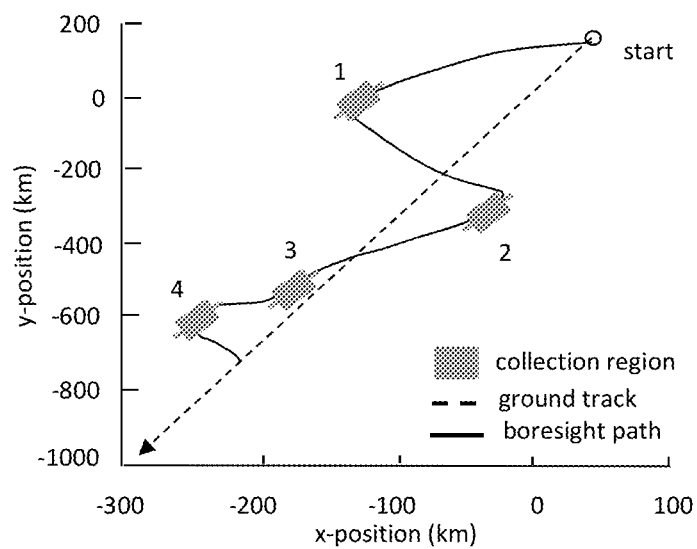
FIGS. 33A and 33B illustrate the experimental implementation of a guidance control policy obtained using the method of the present disclosure.
Figure 33B:
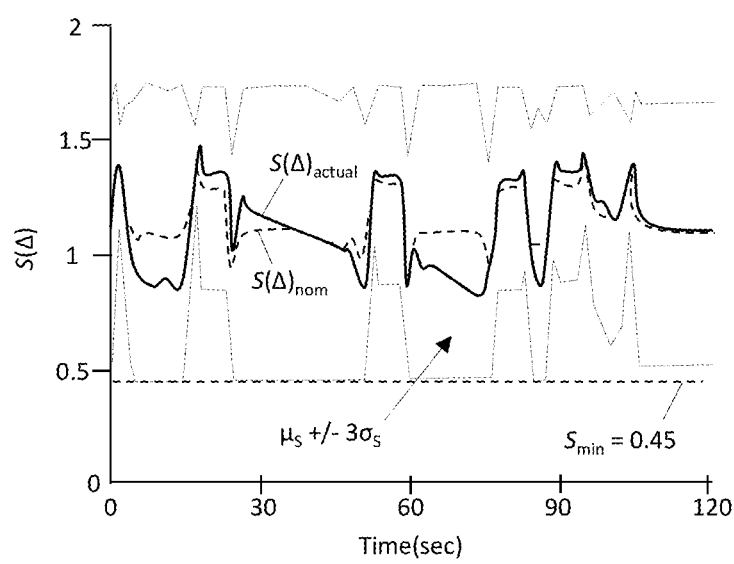

The experimental implementation of a guidance control policy obtained using the method of the present invention is shown in FIGS. 33A and 33B. Referring to FIG. 33A, the satellite simulator is able to acquire all 4 of the requested images as evidenced by the path of the boresight trace, which passes directly through the center of each image collection region within the error tolerances required for imaging. The time history of the CMG singularity index measured during the experiment is observed to lie well within the required $3\sigma$ envelope as shown in FIG. 33B. A guidance control policy obtained using the method of the present invention has thus provided a solution in which the chance of encountering a singularity is small so that feedback authority can be maintained despite the presence of system and other uncertainties.

It will be understood that many additional changes in the details, materials, procedures and arrangement of parts, which have been herein described and illustrated to explain the nature of the disclosure, may be made by those skilled in the art within the principal and scope of the disclosure as expressed in the appended claims. The present disclosure can thus be modified and applied by anyone of ordinary skill in the art to develop a guidance control policy for other applications.

The following is claimed:

1. A computer-implemented method for generating and executing a guidance control policy operatively associated with transitioning a dynamically controlled system controlling an object through a state space from an initial state to a final state over a time interval and an object trajectory, the method comprising:
   providing input data to a processor, the input data comprising:
      the initial state of the dynamically controlled system in the state space, where the initial state comprises a vector of initial system states in the state space;
      the final state of the dynamically controlled system in the state space, where the final state comprises a vector of final system states in the state space;
      a set of parameters of interest; and
      a nominal value for every parameter of interest in the parameters of interest;
   receiving the input data at the processor and determining the guidance command policy using processor-performed steps comprising:
      providing a plurality of Hyper-Pseudospectral (HS) points, where each HS point comprises a set of dimension values, and where each dimension value in the set of dimension values corresponds to a specific parameter of interest in the set of parameters of interest, and where the each dimension value represents an uncertainty associated with the specific parameter of interest;
      storing the plurality of Hyper-Pseudospectral (HS) points in a memory;
      formulating a nominal differential flow $\vec{F}_0(t)$ by substituting the nominal value for each parameter of interest into a dynamical model $\vec{F}(t)$, where the dynamical model $\vec{F}(t)$, comprises:
         a vector of system states $\vec{x}_K(t)$ where the vector of system states $\vec{x}_K(t)$ comprises the vector of initial system states and the vector of final system states provided by the input data;

a vector of system controls $\vec{u}(t)$ where the vector of system controls $\vec{u}(t)$ comprises control variables within the dynamically controlled system over the time interval from the initial state to the final state; and a set of system parameters $\vec{p}_K$ where each system parameter in the set of system parameters $\vec{p}_K$ describes an uncertain constant within the dynamical model $\vec{F}(t)$, and where each parameter of interest provided by the input data is a member of the set of system parameters $\vec{p}_K$;

formulating an off nominal flow $\vec{F}_k(t)$ for each HS point in the plurality of HS points by:
retrieving each HS point from the memory; and
substituting the each HS point into the dynamical model $\vec{F}(t)$, thereby generating one or more off nominal flows $\vec{P}(t)$;

receiving a desired system state, where the desired system state comprises one or more vectors of system states $\vec{x}_K(t)$ within the time interval from the initial state to the final state;

solving for optimized system controls $\vec{u}(t)$ where the optimized system controls $\vec{u}(t)$ is the vector of system controls $\vec{u}(t)$ within the nominal differential flow $\vec{F}_0(t)$ and the one or more off nominal flows $\vec{P}(t)$ which optimizes a performance metric, where the performance metric compares the desired system state with a resulting system state, where the resulting system state comprises one or more a vectors of system states $\vec{x}_K(t)$ generated by the optimized system controls $\vec{u}(t)$; and providing the guidance command policy where the guidance command policy comprises the optimized system controls $\vec{u}(t)$;

communicating the guidance command policy from the processor to a guidance system comprising the object; and controlling the dynamically controlled system in accordance with the guidance control policy and transitioning the object through the state space from the initial state to the final state over the time interval and the object trajectory.

2. The method of claim 1 further comprising:
communicating one or more constraints to the processor, where the one or more constraints comprise a constraint on the vector of system states $\vec{x}_K(t)$, a constraint on the vector of system controls $\vec{u}(t)$, a constraints on the set of system parameters $\vec{p}_K$, or combinations thereof; and
optimizing the performance metric based on the one or more constraints.

3. The method of claim 1 where the performance metric minimizes uncertainty in the vector of system states $\vec{x}_K(t)$ over the time interval, at a specific instant within the time interval, or a combination thereof.

4. The method of claim 3 wherein $g(\vec{F}(t_f))$ is any function whose argument is related to the set of the parameters of interest as described by the plurality of HS points and where the final state is defined at a final time $t_f$, and where the performance metric comprises $J=g(\vec{F}(t_f))$ where $g(\vec{F}(t_f))$ is evaluated at the final time $t_f$.

5. The method of claim 3 wherein $g(\vec{F}(t_f))$ is any function whose argument is related to the set of the parameters of interest as described by the plurality of HS points and where the performance metric comprises an integral of $g(\vec{F}(t))$ with respect to time.

6. The method of claim 3 wherein $g(\vec{F}(t))$ is any function whose argument is related to the set of the parameters of interest as described by the plurality of HS points and where the final state is defined at a final time $t_f$, and where the performance metric comprises a linear combination of an integral of $g(\vec{F}(t))$ with respect to time plus a function $h(\vec{F}(t_f))$, wherein $h(\vec{F}(t_f))$ is any function whose argument is related to the set of the parameters of interest as described by the plurality of HS points and where $h(\vec{F}(t_f))$ is evaluated at the final time $t_f$.

7. The method of claim 1 further comprising providing the plurality of HS points using processor-performed steps by:
generating a space of uncertain parameters, where the space of uncertain parameters has a quantity of dimensions equal to a quantity of parameters of interest comprising the set of parameters of interest, and assigning an axis to each dimension of the space of uncertain parameters;
retrieving one or more statistical distribution types from the memory;
assigning one statistical distribution type to each specific parameter of interest where the statistical distribution type corresponds to an expected variation of the each specific parameter of interest;
mapping the statistical distribution type assigned to the each specific parameter of interest to a single axis of the space of uncertain parameters, such that each axis assigned to the each dimension of the space of uncertain parameters reflects the expected variation of one specific parameter of interest; and
providing the each HS point in the plurality of HS points by selecting a point within the space of uncertain parameters, and providing the set of dimension values for the each HS point by describing a location of the each HS point using the expected variation on every single axis of the space of uncertain parameters, such that every dimension value in the set of dimension values for the each HS point represents an uncertainty associated with a particular specific parameter of interest.

8. The method of claim 7 where the statistical distribution type comprises a uniform distribution, a Gaussian distribution, a Beta distribution, a Poisson distribution, a frequency distribution, a binomial distribution, or combinations thereof.

9. The method of claim 7 further comprising assigning a weight to each HS point in the plurality of HS points where the weight is a positive real number and where a summation of the weights assigned is equal to one, and where the plurality of HS points are provided by optimization of a cost junction J comprising the each HS point and the weight assigned to the each HS point.

10. The method of claim 1 where the input data further comprises an initial location in a three-dimensional physical space and a final location in the three-dimensional physical space, and where the object trajectory is a path of the object in the three-dimensional physical space from the initial location to the final location.

11. The method of claim 10 where the object is a spacecraft and where the spacecraft comprises a plurality of control moment gyroscopes, and further comprising:
   providing the guidance command policy as a vector of gimbal rate commands; and
   operating the plurality of control moment gyroscopes in accordance with the vector of gimbal rate commands.

12. The method of claim 1 where the processor does not comprise the object and further comprising:
   communicating the initial state of the dynamically controlled system in the state space from the object to the processor using a communications interface providing communication between the object and the processor; and
   communicating the guidance command policy from the processor to the guidance system comprising the object using the communications interface.

13. A computer-implemented method for generating and executing a guidance control policy operatively associated with transitioning a dynamically controlled system controlling an object through a state space from an initial state to a final state over a time interval and an object trajectory using a processor, where the processor does not comprise the object, the method comprising:
   communicating the initial state of the dynamically controlled system in the state space from the object to the processor using a communications interface providing communication between the object and the processor, where the initial state comprises a vector of initial system states in the state space and where the initial state further comprises an initial location in a three-dimensional physical space;
   providing additional data to the processor, the additional data comprising:
      the final state of the dynamically controlled system in the state space, where the final state is a vector of final system states in the state space;
      a final location in the three-dimensional physical space;
      a set of parameters of interest; and
      a nominal value for every parameter of interest in the parameters of interest;
   receiving the additional data at the processor and determining the guidance command policy using processor-performed steps comprising:
      providing a plurality of Hyper-Pseudospectral (HS) points, where each HS point comprises a set of dimension values, and where each dimension value in the set of dimension values corresponds to a specific parameter of interest in the set of parameters of interest, and where the each dimension value represents an uncertainty associated with the specific parameter of interest;
      storing the plurality of Hyper-Pseudospectral (HS) points in a memory;
      formulating a nominal differential flow $\vec{F}_0(t)$ by substituting the nominal value for each parameter of interest into a dynamical model $\vec{F}(t)$, where the dynamical model $\vec{F}(t)$, comprises:
         a vector of system states $\vec{x}_K(t)$ where the vector of system states $\vec{x}_K(t)$ comprises the vector of initial system states provided by the object and the vector of final system states provided by the additional data;
         a vector of system controls $\vec{u}(t)$ where the vector of system controls $\vec{u}(t)$ comprises control variables within the dynamically controlled system over the time interval from the initial state to the final state; and
         a set of system parameters $\vec{p}_K$ where each system parameter in the set of system parameters $\vec{p}_K$ describes an uncertain constant within the dynamical model $\vec{F}(t)$, and where each parameter of interest provided by the additional data is a member of the set of system parameters $\vec{p}_K$;
      formulating an off nominal flow $\vec{F}_k(t)$ for each HS point in the plurality of HS points by:
         retrieving each HS point from the memory; and
         substituting the each HS point into the dynamical model $\vec{F}(t)$, thereby generating one or more off nominal flows $\vec{P}(t)$;
      receiving a desired system state, where the desired system state comprises one or more vectors of system states $\vec{x}_K(t)$ within the time interval from the initial state to the final state;
      solving for optimized system controls $\vec{u}(t)$ where the optimized system controls $\vec{u}(t)$ is the vector of system controls $\vec{u}(t)$ within the nominal differential flow $\vec{F}_0(t)$ and the one or more off nominal flows $\vec{P}(t)$ which optimizes a performance metric, where the performance metric compares the desired system state with a resulting system state, where the resulting system state comprises one or more a vectors of system states $\vec{x}_K(t)$ generated by the optimized system controls $\vec{u}(t)$; and
      providing the guidance command policy where the guidance command policy comprises the optimized system controls $\vec{u}(t)$;
   communicating the guidance command policy from the processor to a guidance control module comprising the object through the communications interface providing communication between the object and the processor; and
   utilizing the guidance control module to control the dynamically controlled system in accordance with the guidance control policy and transitioning the object through the state space from the initial state to the final state over the time interval and the object trajectory, where the object trajectory is a path of the object in the three-dimensional physical space from the initial location to the final location.

14. The method of claim 13 further comprising providing the plurality of HS points using processor-performed steps by:
   generating a space of uncertain parameters, where the space of uncertain parameters has a quantity of dimensions equal to a quantity of parameters of interest comprising the set of parameters of interest, and assigning an axis to each dimension of the space of uncertain parameters;

retrieving one or more statistical distribution types from the memory;

assigning one statistical distribution type to each specific parameter of interest where the statistical distribution type corresponds to an expected variation of the each specific parameter of interest;

mapping the statistical distribution type assigned to the each specific parameter of interest to a single axis of the space of uncertain parameters, such that each axis assigned to the each dimension of the space of uncertain parameters reflects the expected variation of one specific parameter of interest; and providing the each HS point in the plurality of HS points by selecting a point within the space of uncertain parameters, and providing the set of dimension values for the each HS point by describing a location of the each HS point using the expected variation on every single axis of the space of uncertain parameters, such that every dimension value in the set of dimension values for the each HS point represents an uncertainty associated with a particular specific parameter of interest.

\* \* \* \* \*